US012651416B2

(12) United States Patent
Ishimaru et al.

(10) Patent No.: US 12,651,416 B2
(45) Date of Patent: Jun. 9, 2026

(54) IMAGE PROCESSING APPARATUS, IMAGE PROCESSING METHOD, AND IMAGE PROCESSING SYSTEM

(71) Applicants: SONY SEMICONDUCTOR SOLUTIONS CORPORATION, Kanagawa (JP); SONY GROUP CORPORATION, Tokyo (JP)

(72) Inventors: Mikio Ishimaru, Tokyo (JP); Sayuri Wakabayashi, Kanagawa (JP); Go Matsumori, Kanagawa (JP)

(73) Assignees: SONY SEMICONDUCTOR SOLUTIONS CORPORATION, Kanagawa (JP); SONY GROUP CORPORATION, Tokyo (JP)

( * ) Notice: Subject to any disclaimer, the term of this patent is extended or adjusted under 35 U.S.C. 154(b) by 178 days.

(21) Appl. No.: 18/263,861

(22) PCT Filed: Jan. 17, 2022

(86) PCT No.: PCT/JP2022/001335
§ 371 (c)(1),
(2) Date: Aug. 1, 2023

(87) PCT Pub. No.: WO2022/172692
PCT Pub. Date: Aug. 18, 2022

(65) Prior Publication Data
US 2024/0037871 A1 Feb. 1, 2024

(30) Foreign Application Priority Data
Feb. 12, 2021 (JP) ................................. 2021-021158

(51) Int. Cl.
*G06T 19/00* (2011.01)

(52) U.S. Cl.
CPC ................................... *G06T 19/006* (2013.01)

(58) Field of Classification Search
None
See application file for complete search history.

(56) References Cited

U.S. PATENT DOCUMENTS

2010/0045869 A1* 2/2010 Baseley ................. G06T 19/00
                                                                         463/31
2017/0140552 A1  5/2017 Woo et al.
2019/0087015 A1  3/2019 Lam et al.

FOREIGN PATENT DOCUMENTS

JP      2016-033611 A      3/2016
JP      2016-058042 A      4/2016
(Continued)

OTHER PUBLICATIONS

International Search Report and Written Opinion of PCT Application No. PCT/JP2022/001335, issued on Feb. 22, 2022, 13 pages of ISRWO.

*Primary Examiner* — Robert J Craddock
(74) *Attorney, Agent, or Firm* — CHIP LAW GROUP

(57) ABSTRACT

An image processing apparatus includes a data acquisition unit that acquires first sensing data that is image sensing data and second sensing data that is sensing data of a type different from the first sensing data and a display processing unit that performs a display process for displaying an augmented reality space formed by augmenting a real space with use of the first sensing data and the second sensing data. The display processing unit performs, by using the second sensing data, a display process for superimposing a virtual object on a real object recognized as an object present in the real space.

16 Claims, 24 Drawing Sheets

(56)  References Cited

FOREIGN PATENT DOCUMENTS

| | | | |
|---|---|---|---|
| JP | 2017-027206 | A | 2/2017 |
| JP | 2019-526847 | A | 9/2019 |
| JP | 2019-207573 | A | 12/2019 |
| WO | 2016/031358 | A1 | 3/2016 |
| WO | 2016/111174 | A1 | 7/2016 |
| WO | 2017/047178 | A1 | 3/2017 |
| WO | 2018/179644 | A1 | 10/2018 |
| WO | 2020/012955 | A1 | 1/2020 |

\* cited by examiner

100

COMMUNICATION
NETWORK

101

SERVER DEVICE
- THREE-DIMENSIONAL MODEL OF REAL SPACE
- VIRTUAL OBJECT INFORMATION

F I G . 2
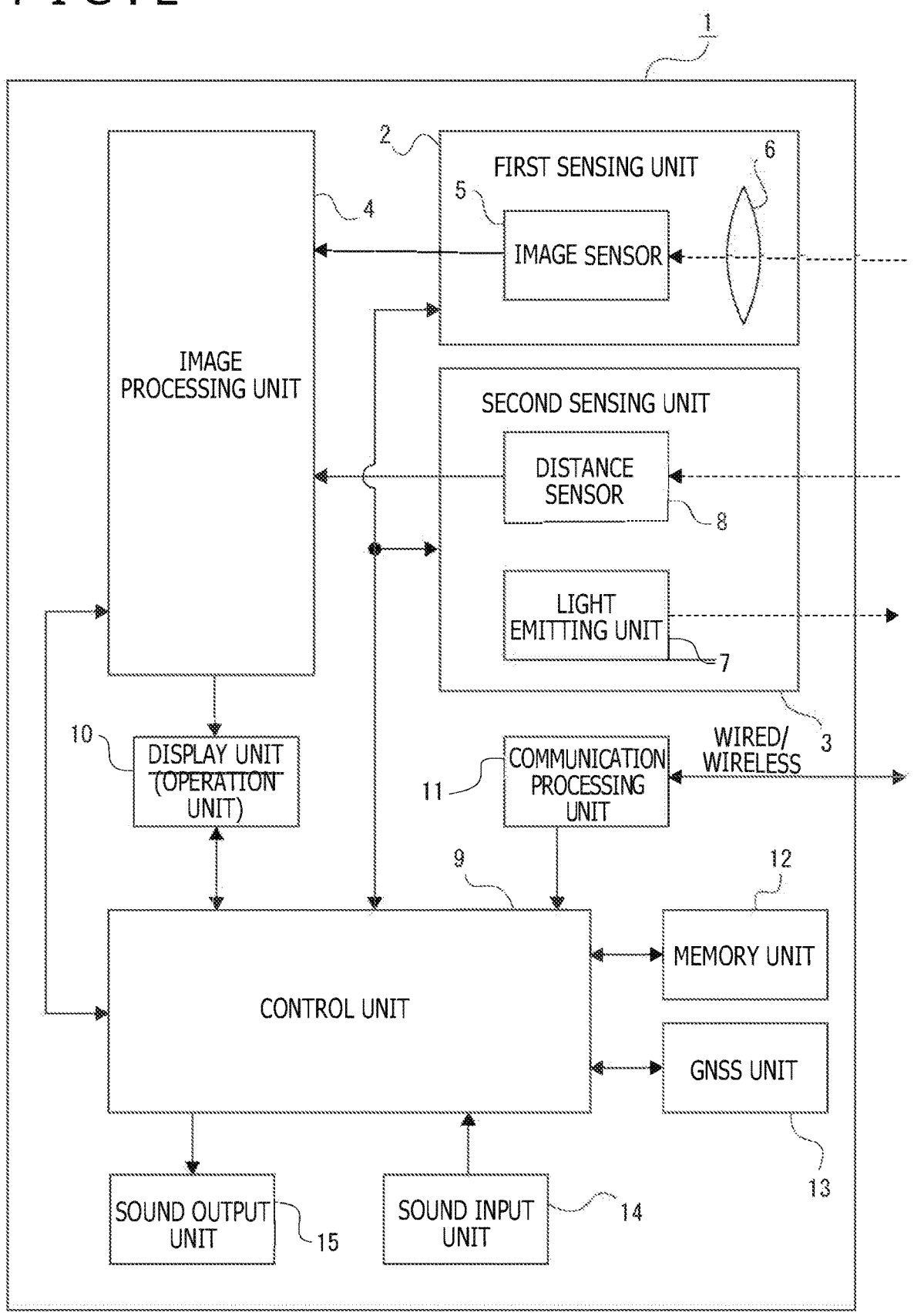

F I G . 3
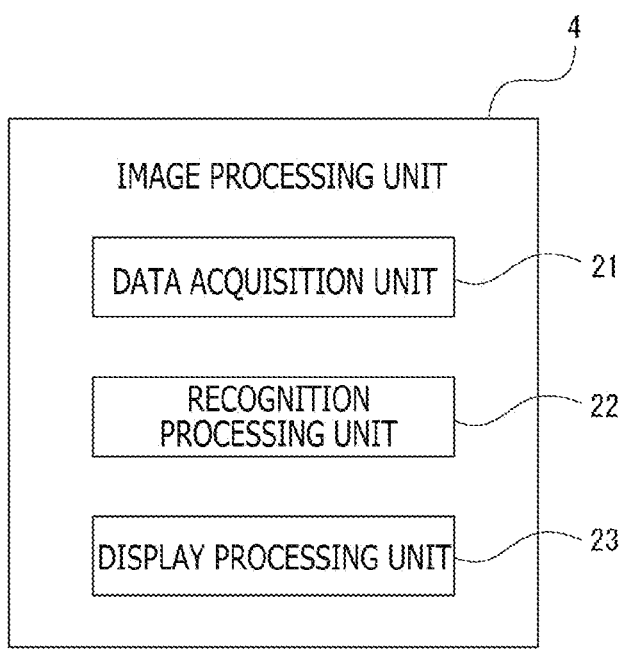

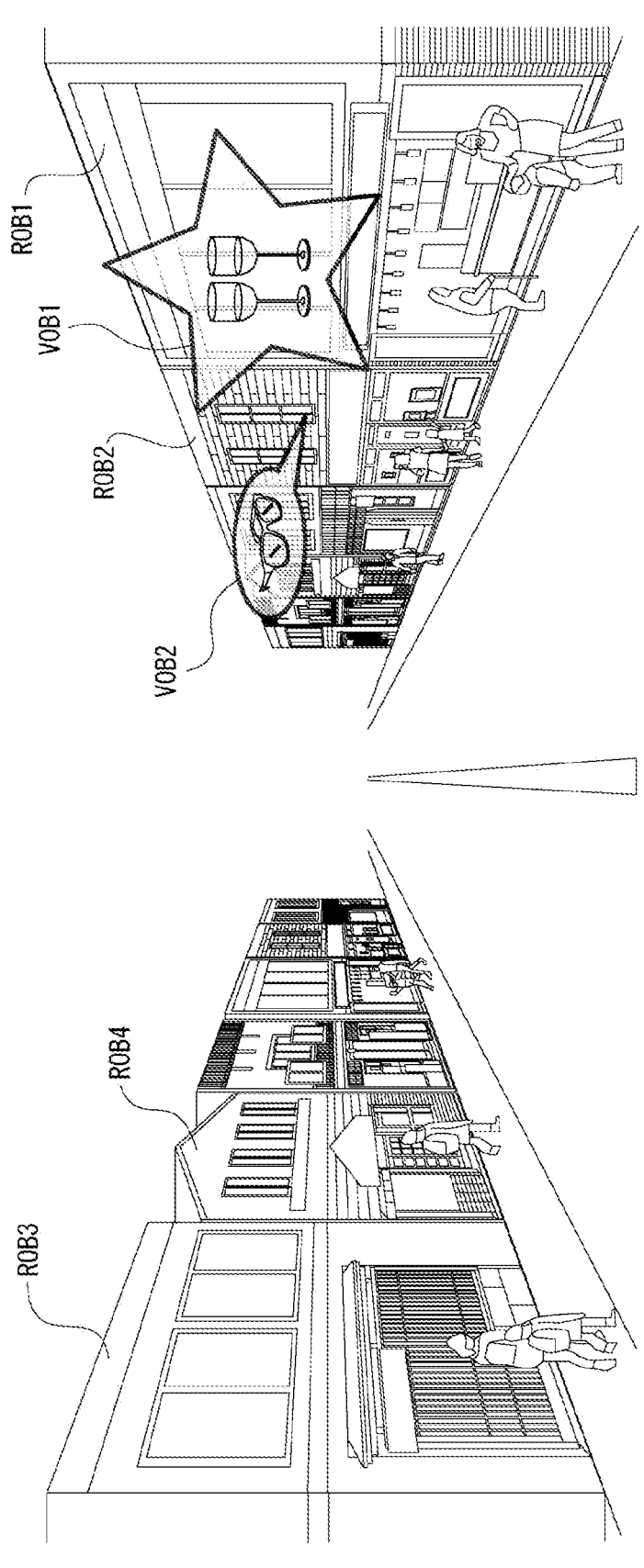
F I G . 6

F I G . 7
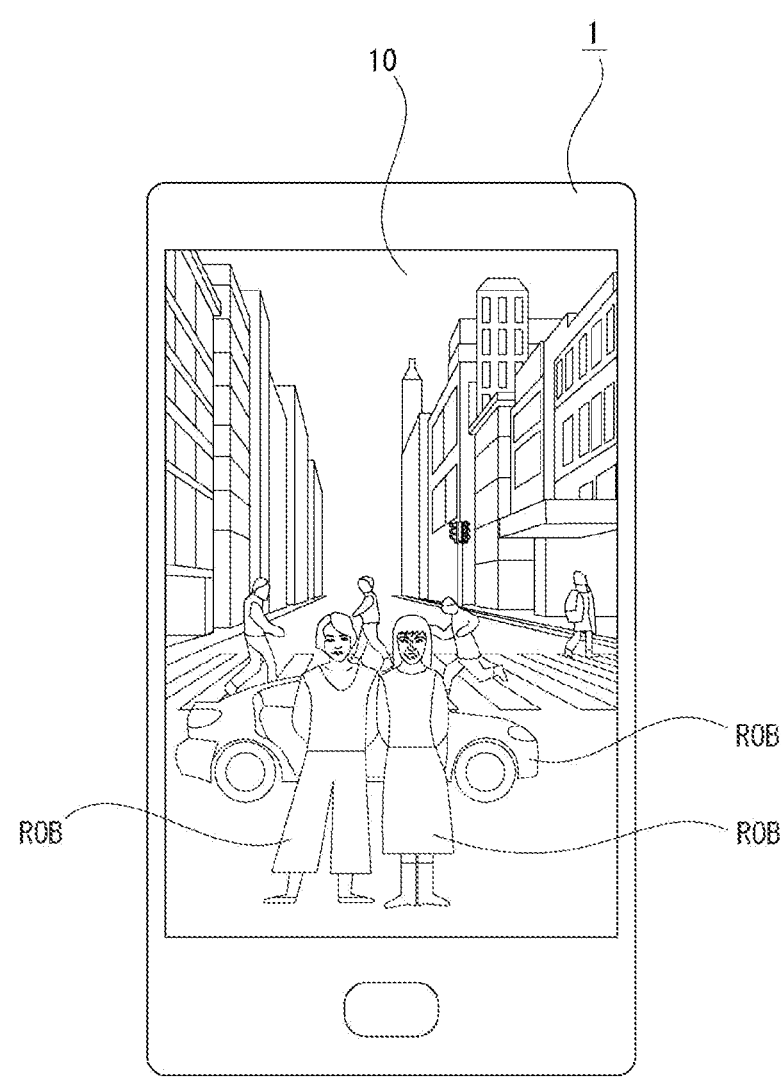

FIG.9

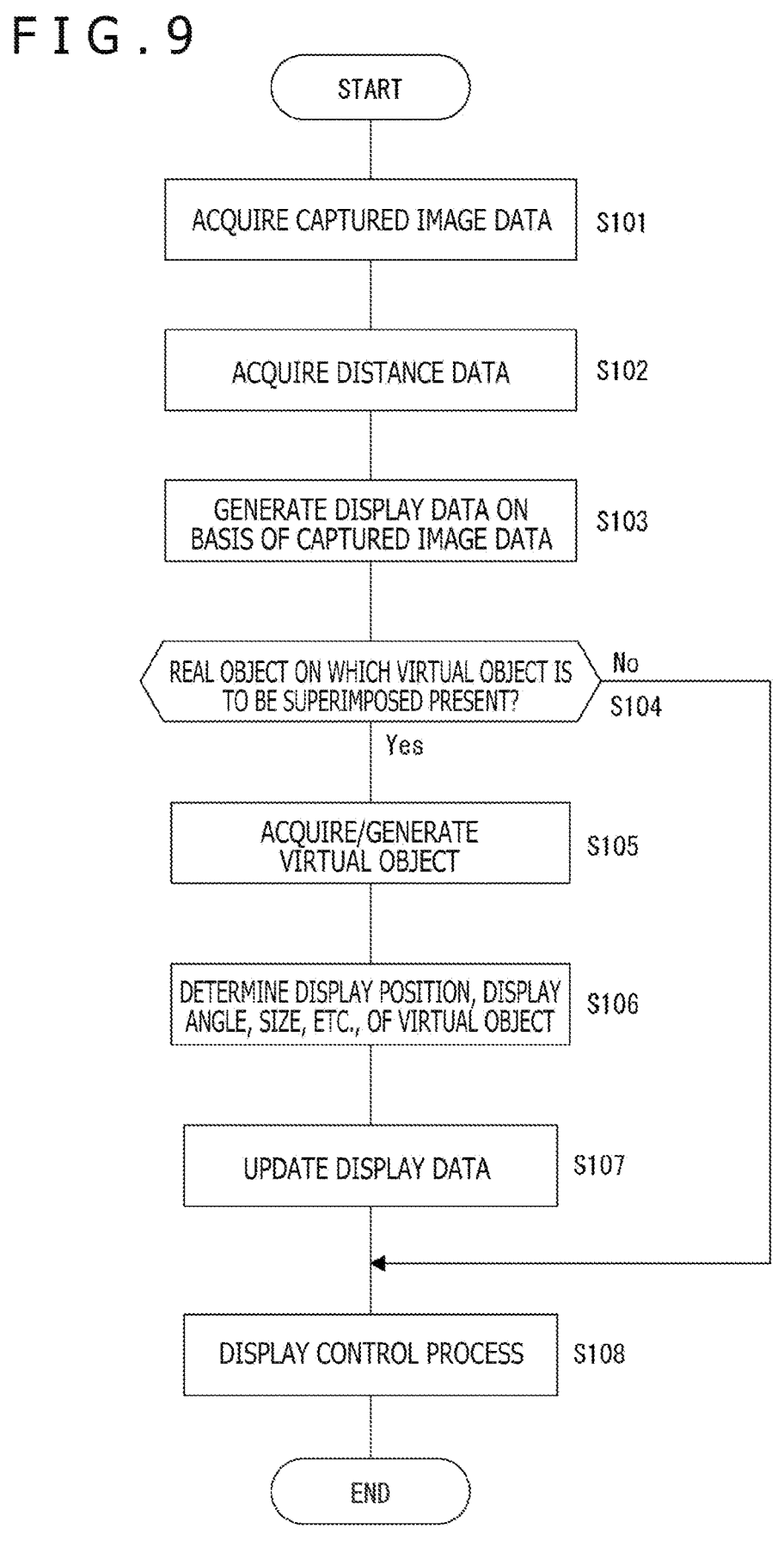

```
              ┌──────────┐
              │  START   │
              └──────────┘
                   │
        ┌──────────────────────────┐
        │ ACQUIRE CAPTURED IMAGE DATA │   S101
        └──────────────────────────┘
                   │
        ┌──────────────────────────┐
        │   ACQUIRE DISTANCE DATA   │   S102
        └──────────────────────────┘
                   │
        ┌──────────────────────────┐
        │  GENERATE DISPLAY DATA ON │   S103
        │ BASIS OF CAPTURED IMAGE DATA │
        └──────────────────────────┘
                   │
       ╱───────────────────────────╲   No
      ╱ REAL OBJECT ON WHICH VIRTUAL OBJECT IS ╲─────────┐
      ╲ TO BE SUPERIMPOSED PRESENT? ╱   S104            │
       ╲───────────────────────────╱                    │
                   │ Yes                                 │
        ┌──────────────────────────┐                    │
        │     ACQUIRE/GENERATE      │   S105             │
        │      VIRTUAL OBJECT       │                    │
        └──────────────────────────┘                    │
                   │                                     │
        ┌──────────────────────────┐                    │
        │ DETERMINE DISPLAY POSITION, DISPLAY │ S106      │
        │ ANGLE, SIZE, ETC., OF VIRTUAL OBJECT │         │
        └──────────────────────────┘                    │
                   │                                     │
        ┌──────────────────────────┐                    │
        │    UPDATE DISPLAY DATA    │   S107             │
        └──────────────────────────┘                    │
                   │◄────────────────────────────────────┘
        ┌──────────────────────────┐
        │  DISPLAY CONTROL PROCESS  │   S108
        └──────────────────────────┘
                   │
              ┌──────────┐
              │   END    │
              └──────────┘
```

F I G . 1 3
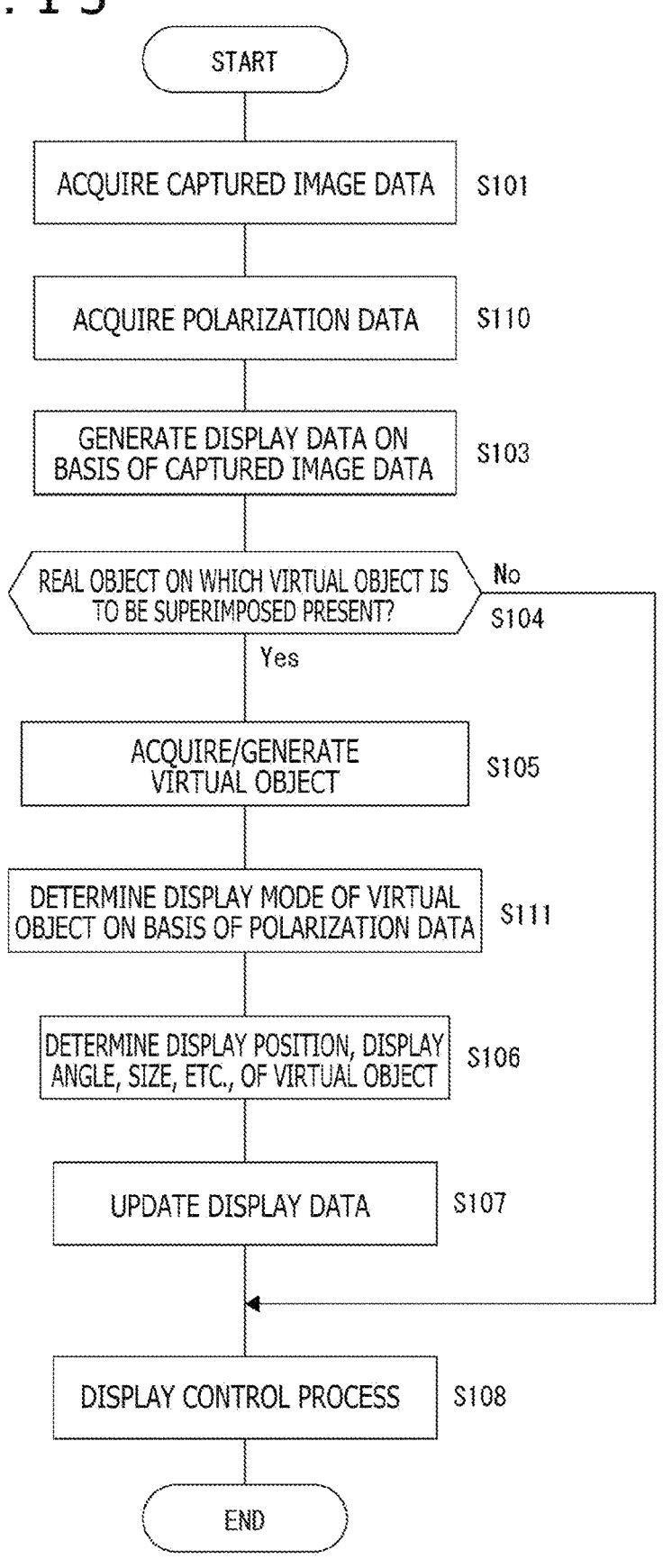

FIG.24

IMAGE PROCESSING APPARATUS, IMAGE PROCESSING METHOD, AND IMAGE PROCESSING SYSTEM

CROSS REFERENCE TO RELATED APPLICATIONS

This application is a U.S. National Phase of International Patent Application No. PCT/JP2022/001335 filed on Jan. 17, 2022, which claims priority benefit of Japanese Patent Application No. JP 2021-021158 filed in the Japan Patent Office on Feb. 12, 2021. Each of the above-referenced applications is hereby incorporated herein by reference in its entirety.

TECHNICAL FIELD

The present technology relates to a technical field of an image processing apparatus, an image processing method, and an image processing system for performing image processing associated with an augmented reality space by using two types of sensing data.

BACKGROUND ART

A technology associated with an augmented reality space produced by arranging a virtual object in a real space is known.

For example, disclosed in the following PTL 1 is a technology which presents an augmented reality space to a user wearing a head-mounted display.

CITATION LIST

Patent Literature

[PTL 1]
PCT Patent Publication No. WO2018/179644

SUMMARY

Technical Problems

Described in PTL 1 is improvement of user-friendliness achieved by superimposed display of information indicating a waiting time, for example. Further disclosed is such a technology which controls a sensor on the basis of required accuracy variable for each application.

Meanwhile, when a user experiences an augmented reality space, this augmented reality space provided for the user is required to be such a space which presents information appropriate for the user in an appropriate mode.

The present technology has been developed in consideration of the above-mentioned circumstances. It is an object of the present technology to provide an augmented reality space achieving high user-friendliness or an augmented reality space achieving high visibility.

Solution to Problems

An image processing apparatus according to the present technology includes a data acquisition unit that acquires first sensing data that is image sensing data and second sensing data that is sensing data of a type different from the first sensing data, and a display processing unit that performs a display process for displaying an augmented reality space formed by augmenting a real space with use of the first sensing data and the second sensing data. A display process for superimposing a virtual object on a real object recognized as an object present in the real space is performed by using the second sensing data.

The superimposed display of the virtual object on the real object achieves display of an augmented reality space where the virtual object is arranged without giving a sense of strangeness.

The second sensing data of the image processing apparatus described above may be sensing data from which distance information associated with the real object is extractable.

According to this configuration, the display mode of the virtual object can be varied according to the distance information.

The image processing apparatus described above may include a switching processing unit that switches between a first mode for accepting a first operation for the virtual object and a second mode for accepting a second operation for the virtual object. The switching processing unit may switch to the first mode in a case where a predetermined portion of a user is recognized within the augmented reality space by using the first sensing data or the second sensing data.

For example, a first process is executed in a case where a finger of the user is recognized on the basis of the second sensing data from which distance information is extractable.

In the image processing apparatus described above, the first mode may be a mode for accepting an operation performed for the virtual object according to movement of the predetermined portion in the augmented reality space, and the second mode may be a mode for accepting a touch operation performed by the user for a display region of the virtual object on a display unit.

For example, in a case where a virtual touch operation performed by a finger of the user for the virtual object in the augmented reality space is detected by a ranging sensor or the like, transition to the first mode is achieved. In a case where a touch operation for the image region of the virtual object displayed on the display unit is detected, transition to the second mode is achieved.

The display processing unit of the image processing apparatus described above may designate a different display mode of a display object between the first mode and the second mode.

The display object is an object displayed on the display unit. For example, the display object includes not only the virtual object arranged in the augmented reality space, but also an operation icon image and the like not arranged in the augmented reality space. The example which varies the display mode of the display object includes an example which changes a display size, an example which switches between display and non-display for each display object, and other examples.

The display processing unit of the image processing apparatus described above may perform a display process for designating a different size of the virtual object between the first mode and the second mode.

For example, an optimum UI (User Interface) for the first mode may be different from an optimum UI for the second mode. In this case, a different size of the virtual object is designated for the first mode and the second mode. Specifically, in a case where an operation for the virtual object is detected in the augmented reality space, the virtual object is displayed in a large size to improve visibility, for the user, of letter information or the like displayed as the virtual object. Meanwhile, in a case where a touch operation or the like for the display unit is detected, this operation is recognized as a selection operation for selecting the virtual object, and a process for displaying a web page associated with the virtual object provided as an advertisement object or the like is executed, for example.

The display processing unit of the image processing apparatus described above may perform an occlusion process for the virtual object on the basis of distance information associated with the predetermined portion.

For example, in a case where the predetermined portion is a finger of the user and is located at a short distance, an occlusion process is performed to hide the virtual object behind the finger of the user.

The image processing apparatus described above may include an operation target identification unit that identifies the virtual object designated as a target of an operation performed by the predetermined portion, with use of the first sensing data in a case where the predetermined portion is recognized.

It is possible that the user operates the virtual object while viewing the virtual object and an image of his or her finger displayed on the display unit. In such a case, the virtual object corresponding to the operation target is identified according to a positional relation between the image of the finger and the virtual object on the display unit.

The switching processing unit of the image processing apparatus described above may switch to the second mode in a case where the predetermined portion is detected on the basis of sensing data obtained by imaging in a direction opposite to an imaging direction of an imaging unit that obtains the first sensing data.

In such a case, it is assumed that the predetermined portion of the user is unlikely to be detected in the first sensing data. Accordingly, it is considered that switching to the second mode for accepting the second operation is most appropriate.

The display processing unit of the image processing apparatus described above may perform a display process for issuing an alert regarding a step detected with use of the distance information.

In this manner, a notification of information associated with a step or the like not recognized by the user can be issued as the virtual object.

The display processing unit of the image processing apparatus described above may determine the size of the virtual object to be superimposed on the real object, according to a distance of the real object.

In this manner, the size of the virtual object is determined according to the distance from the user.

The second sensing data of the image processing apparatus described above may be sensing data on the basis of which a material of the real object is identifiable. The display processing unit may perform a display process for superimposing the virtual object on the real object whose material is identified.

For example, the sensor for outputting the second sensing data is a polarization sensor, a multispectral sensor, or the like.

The image processing apparatus described above may include a self-position estimation unit that estimates a self-position. The self-position estimation unit may correct the self-position on the basis of material information associated with the real object.

According to this configuration, highly accurate self-position information can be obtained.

The display processing unit of the image processing apparatus described above may perform a display process for displaying the virtual object to be superimposed, in a mode different between the real object whose material identified with use of the second sensing data is a transparent material and the real object whose material identified with use of the second sensing data is not a transparent material.

For example, in a case where the first sensing data that is the image sensing data is applied, there is a possibility that the real object such as a door including glass and a window is difficult for the user to recognize. In such a case, the virtual object can be superimposed and displayed on a glass member on the basis of recognition of the real object which is the glass member, with use of a polarization sensor, a multispectral sensor, or the like.

The second sensing data of the image processing apparatus described above may be sensing data on the basis of which a polarized state of light reflected from the real object is identifiable.

Specifically, the second sensing data is sensing data output from a polarization sensor.

The display processing unit of the image processing apparatus described above may perform a display process for superimposing the virtual object on the real object identified as a part of a human body with use of the second sensing data.

For example, some persons do not desire to appear in an image or a video. Particularly, considering issues of privacy, it is not preferable to store or stream an image captured in a state where persons are identifiable. According to this configuration, a part of a human body, such as a face, is identified, and the virtual object can be superimposed and displayed on the identified part of the human body.

The first sensing data and the second sensing data of the image processing apparatus described above may be generated on the basis of signals output from an identical sensor.

For example, not only image sensing data but also distance data can be acquired from data output from a CMOS sensor, in some cases.

An image processing method according to the present technology causes a computer device to execute a process that acquires first sensing data that is image sensing data and second sensing data that is sensing data of a type different from the first sensing data, and a display process for displaying an augmented reality space formed by augmenting a real space with use of the first sensing data and the second sensing data.

An image processing system according to the present technology includes a display unit that is capable of displaying an image, a first sensing unit that acquires first sensing data that is image sensing data, a second sensing unit that acquires second sensing data that is sensing data of a type different from the first sensing data, and a display processing unit that performs a display process for causing the display unit to display an augmented reality space formed by augmenting a real space with use of the first sensing data and the second sensing data.

The various effects described above can similarly be achieved by the image processing method and the image processing system configured as above.

BRIEF DESCRIPTION OF DRAWINGS

FIG. 2 is a block diagram depicting a configuration example of an image processing apparatus according to a first embodiment.

FIG. 3 is a functional block diagram of an image processing unit according to the first embodiment.

FIG. 6 is a diagram depicting a display example of an augmented reality space in a third case.

FIG. 7 is a diagram depicting a display example of an augmented reality space in a fourth case and illustrating a state where a display process has not yet been applied to human bodies.

FIG. 9 is a flowchart for explaining a processing example executed by a processing unit according to the first embodiment.

FIG. 13 is a flowchart for explaining a processing example executed by a processing unit according to the second embodiment.

FIG. 24 is a flowchart for explaining a processing example executed by a processing unit according to the fourth embodiment.

DESCRIPTION OF EMBODIMENTS

Embodiments according to the present technology will hereinafter be described in the following order with reference to the accompanying drawings.

<1. Augmented reality space>
<2. Configuration of image processing apparatus>
<3. Functional configuration>
<4. Example cases>
<4-1. First case>
<4-2. Second case>
<4-3. Third case>
<4-4. Fourth case>
<5. Process flow>
<6. Second Embodiment>
<7. Third Embodiment>
<7-1. Fifth case>
<7-2. Sixth case>
<8. Fourth Embodiment>
<9. Summary>
<10. Present technology>

1. Augmented Reality Space

An image processing apparatus according to the present technology executes various processes associated with an augmented reality space (AR: Augmented Reality). An augmented reality space will herein be touched upon.

An augmented reality space is a space where a virtual object (annotation) is arranged in a real space imaged by an imaging unit. As an example, an augmented reality space produced by arranging a virtual object on a through image captured by an imaging unit included in a portable terminal device, such as a smartphone, is displayed on a display unit of this portable terminal device.

Arrangement of the virtual object is achieved by placing a three-dimensional model of the virtual object at a predetermined position. This arrangement includes a mode for superimposing a virtual object on a real object.

For constructing an augmented reality space, a three-dimensional model of a real space is created beforehand. For example, the three-dimensional model of the real space is obtained by imaging a target real space with use of an imaging device such as a celestial camera. In this manner, determination of an arrangement mode of a virtual object is achievable. Alternatively, the three-dimensional model may be obtained by measurement with use of a measuring device other than a celestial camera, for example.

Figure 1:
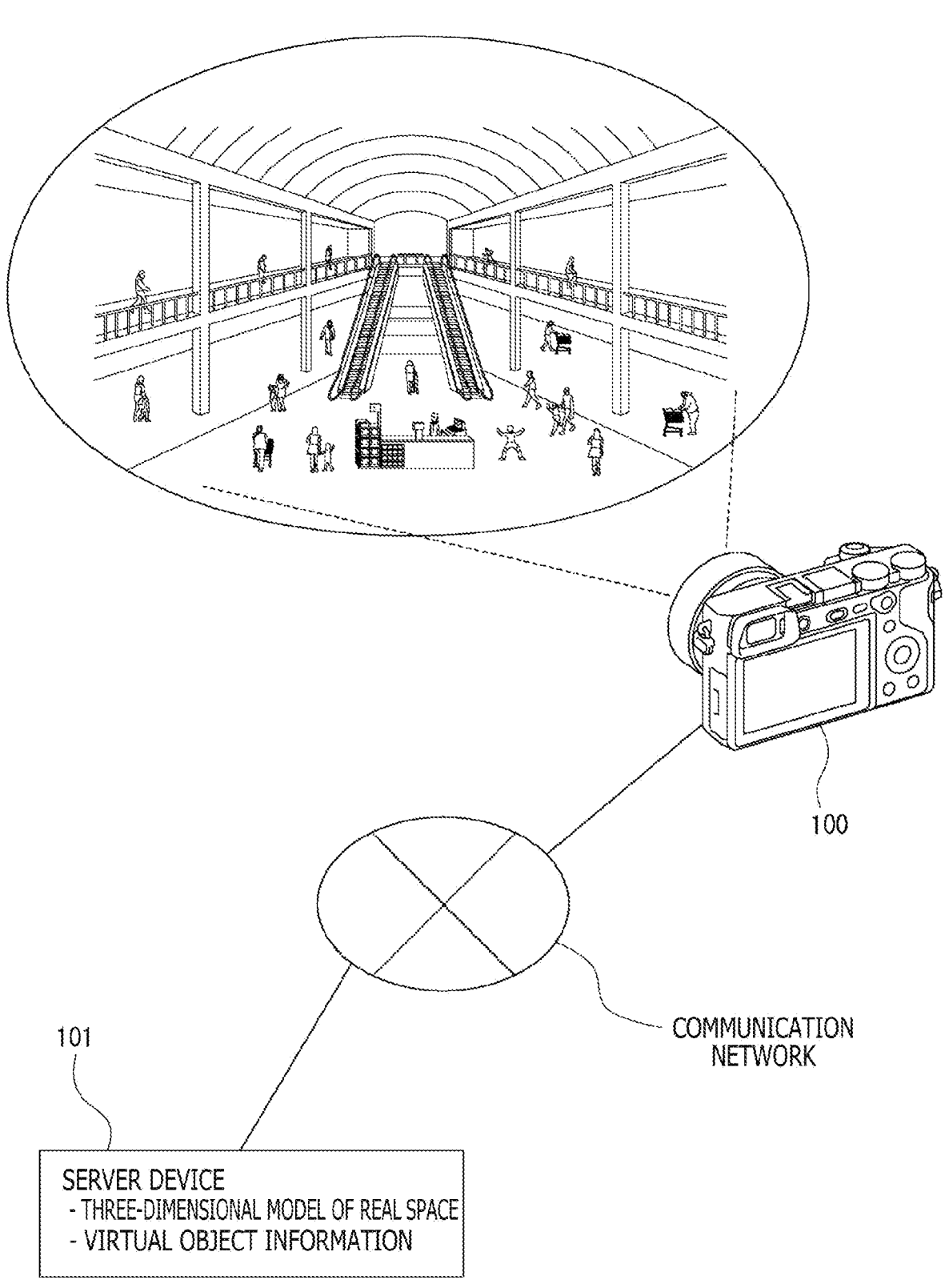
FIG. 1 is a schematic diagram depicting a configuration example of a system which acquires a three-dimensional model of a real space.

The three-dimensional model of the real space is stored in a server device, or an image processing apparatus according to the present technology, for example. FIG. 1 is an example where a three-dimensional model of a real space, which is a shopping mall imaged by a celestial camera 100, is stored in a server device 101. In addition to the above, the server device 101 also stores information associated with virtual objects arranged in an augmented reality space. The information associated with the virtual objects contains information indicating a direction and a position of arrangement determined on the basis of the three-dimensional model of the real space, three-dimensional models of the virtual objects, and the like.

The image processing apparatus according to the present technology performs a display process and other processes associated with the augmented reality space described above. Described hereinafter will be an example of a smartphone 1 constituting the image processing apparatus.

The smartphone 1 is capable of executing a display process for displaying an augmented reality space according to an operation by a user, a process for detecting an operation associated with the augmented reality space, and a process corresponding to a detected operation.

For example, the smartphone 1 superimposes display of logos of stores, store information, and the like created as virtual objects on display of stores imaged as real objects. The user visually recognizes these virtual objects to obtain outlines or more detailed information associated with the stores.

Moreover, the smartphone 1 performs a process for displaying an augmented reality space where characters as virtual objects are arranged as concierges at an entrance and other places of the shopping mall. The user is allowed to acquire information associated with a store where a desired product can be purchased, information regarding a route to the corresponding store, and the like by performing an operation for the corresponding virtual object as a concierge (character object).

At this time, the smartphone 1 may acquire information associated with a behavior history or a purchase history of the user, and present, to the user, presentation information selected on the basis of these items of history information, via the virtual object as the concierge. Specifically, in a case of detection of a predetermined operation performed by the user for the virtual object as the concierge, the smartphone 1 executes a process for providing the user with information associated with a store suited for preferences of the user according to the predetermined operation.

The smartphone 1 performs a process for displaying an augmented reality space where virtual objects including translated letter information are arranged. By this process, the user is allowed to enjoy shopping on the basis of translated information even in a foreign shopping mall or the like. Note that the smartphone 1 achieves not only translation of letter information, but also arrangement and display of virtual objects including translated letter information, without giving a sense of strangeness. In this manner, for example, the user is allowed to visually recognize a poster or the like as a virtual object arranged in an appropriate direction according to a direction of a wall or the like. Accordingly, it is possible to improve a sense of immersion of the user into the augmented reality space.

The smartphone 1 executes a process for arranging virtual objects or the like for raising elation of the user. By this process, the user is allowed to enjoy shopping and the like more.

The smartphone 1 superimposes display of virtual objects including advertisement information on real objects such as a wall. The user is therefore allowed to acquire detailed advertisement information and purchase a product displayed in an advertisement, by performing an operation for the advertisement.

As described above, the smartphone 1 is capable of executing a display process for displaying an augmented reality space, a process for accepting an operation to achieve various processes corresponding to the operation input from the user to the augmented reality space, and a process performed according to the operation. Accordingly, the user is allowed to enjoy various services by performing various operations for the augmented reality space displayed on the smartphone 1.

2. Configuration of Image Processing Apparatus

FIG. 2 depicts a configuration of the smartphone 1 constituting the image processing apparatus according to the first embodiment.

The smartphone 1 has a configuration capable of generating two types of sensing data. Several examples of sensing data are adoptable as the two types of sensing data. In this example, captured image data and distance data will be adopted by way of example.

The smartphone 1 includes a first sensing unit 2, a second sensing unit 2, and an image processing unit 4.

The first sensing unit 2 includes an image sensor 5 which is a CCD (Charge Coupled Device) type or CMOS (Complementary Meta-Oxide Semiconductor) type image sensor, for example, and an imaging optical system 6 for guiding incident light to the image sensor 5. The imaging optical system 6 includes various types of lenses such as a zoom lens and a focus lens and optical components such as a shutter mechanism.

The image sensor 5 exposes light entering from a subject via the imaging optical system 6, and photoelectrically converts the exposed light to obtain an electric signal.

Pixels constituting sensing elements are two-dimensionally arrayed to form a sensor surface of the image sensor 5. Moreover, the image sensor 5 includes a vertical drive unit, a horizontal drive unit, and the like to achieve photoelectric conversion by the sensing elements.

The image sensor 5 includes a processing unit which performs processes such as a CDS (Correlated Double Sampling) process, an AGC (Automatic Gain Control) process, and an A/D (Analog/Digital) conversion process for an electric signal obtained through photoelectric conversion by the pixels. Accordingly, the image sensor 5 obtains captured image data as digital data. The captured image data obtained by the image sensor 5 is output to the image processing unit 4 disposed in a subsequent stage.

The second sensing unit 3 includes a light emitting unit 7 and a distance sensor 8. Moreover, the second sensing unit 3 may include an optical system for guiding light to the distance sensor 8.

The light emitting unit 7 performs a process for applying distance measurement IR (Infrared) light toward the outside of the smartphone 1. In a case where an iToF (indirect Time of Flight) system is used for acquiring distance data, the light emitting unit 7 includes a modulation control unit which modulates intensity of irradiation light. The modulation control unit supplies a driving signal at a low frequency (e.g., 70 MHz or lower) to a light source included in the light emitting unit 7, to apply intensity-modulated light from the light source. The light source of the light emitting unit 7 achieves pulsed light emission which applies light having modulated intensity according to a supplied driving signal having a low-frequency square wave.

Alternatively, distance data may be acquired with use of a dToF (direct Time of Flight) system which achieves distance measurement on the basis of a time difference between irradiation timing of irradiation light and reception timing of reflection light.

The distance sensor 8 includes a sensor surface where pixels constituting sensing elements each having sensitivity to IR light are two-dimensionally arrayed. Moreover, the distance sensor 8 includes a vertical drive unit, a horizontal drive unit, a transfer gate drive unit, and the like to achieve photoelectric conversion by the sensing elements.

The image processing unit 4 acquires captured image data as the first sensing data from the first sensing unit 2. Moreover, the image processing unit 4 acquires distance data as the second sensing data from the second sensing unit 3.

The image processing unit 4 acquires three-dimensional data and the like of a virtual object VOB from an external processing device such as the server device 101 described above.

The image processing unit 4 recognizes a real object ROB on the basis of the distance data obtained from the second sensing unit 3. Note that the real object ROB may be recognized with use of not only the distance data obtained from the second sensing unit 3, but also the captured image data obtained from the first sensing unit 2.

The image processing unit 4 executes processes for arranging and rearranging the virtual object VOB in the augmented reality space and a process for causing the display unit to display the augmented reality space where the virtual object VOB is arranged.

The image processing unit 4 performs various types of display processes according to an operation by the user as well as the processes described above. For example, the image processing unit 4 performs a process for displaying a web page containing details of a product, in response to an operation performed by the user to select an advertisement of this product. Details of each of examples will be described below.

The smartphone 1 includes a control unit 9, a display unit 10, a communication processing unit 11, and a memory unit 12.

The control unit 9 has an arithmetic processing function performed by a CPU (Central Processing Unit) or the like to achieve overall control of the smartphone 1. The control unit 9 transmits and receives information to and from an external information processing device via the communication processing unit 11. For example, information associated with the virtual object VOB described above is transmitted to the image processing unit 4 via the communication processing unit 11 and the control unit 9.

Note that the image processing unit 4 and the communication processing unit 11 may be configured to directly exchange information with each other.

The display unit 10 has a function of displaying captured image data. Moreover, the display unit 10 has a touch panel function to function as an operation unit. The control unit 9 is capable of executing a process for detecting an input operation input from the display unit 10 provided as an operation unit and a process for handling the input operation.

The control unit 9 stores, in the memory unit 12, information necessary for performing various types of control.

The smartphone 1 includes a GNSS (Global Navigation Satellite System) unit 13 and a sound input unit 14.

The GNSS unit 13 has components such as a reception unit which receives radio waves generated from a positioning system including multiple satellites and the like.

The control unit 9 executes a process for estimating a self-position by using radio waves received by the GNSS unit 13.

Note that the process for estimating the self-position of the smartphone 1 may be performed without using information acquired from the GNSS unit 13. For example, the smartphone 1 may acquire self-position information by connecting to a wireless LAN (Local Area Network) such as Wifi (registered trademark).

The control unit 9 performs the process for estimating the self-position on the basis of an acoustic signal input from the sound input unit 14. For example, in a certain case, a floor in a shopping mall or the like having multiple floors is difficult to identify on the basis of self-position estimation using the GNSS unit 13. In such a case, detailed self-position estimation is achievable by acquiring, via the sound input unit 14, music, acoustic information, or the like generated from surrounding stores or other places.

In addition, the smartphone 1 includes a sound output unit 15. The sound output unit 15 includes a speaker or the like, and is used for providing voice navigation for the user, for example.

3. Functional Configuration

FIG. 3 is a block diagram depicting a functional configuration included in the image processing unit 4 of the smartphone 1.

The image processing unit 4 has a data acquisition unit 21, a recognition processing unit 22, and a display processing unit 23.

The data acquisition unit 21 acquires captured image data (image sensing data) as the first sensing data obtained from the image sensor 5 and distance data (distance sensing data) as the second sensing data obtained from the distance sensor 8. The data acquisition unit 21 further acquires the virtual object VOB from a different information processing device.

The recognition processing unit 22 performs a process for recognizing a real object within an angle of view on the basis of the captured image data and the distance data. Moreover, the recognition processing unit 22 is capable of identifying a shape and the like of the real object on the basis of the distance data.

Further, the recognition processing unit 22 may recognize a human by performing a determination process for determining whether or not a real object is a person or a part of a body.

The display processing unit 23 executes a process for causing the display unit 10 to display an augmented reality space. Note that the display processing unit 23 displays several types of objects on the display unit 10. For example, an object present in the augmented reality space, such as information associated with the real object ROB displayed on the basis of captured image data and with the virtual object VOB acquired from the different information processing device, is defined as one of targets of the display process performed by the display processing unit 23.

Moreover, an icon image simply displayed on the display unit 10 other than the object present in the augmented reality space is also defined as one of targets of the display process performed by the display processing unit 23. In the following description, a display item other than the real object ROB and the virtual object VOB present as three-dimensional objects in the augmented reality space will be referred to as an "icon image Pi." In addition, the real object ROB, the virtual object VOB, and the icon image Pi will collectively be referred to as a display object.

Shapes, sizes, and the like of the real object ROB and the virtual objects VOB are variable according to changes of an imaging position and an imaging direction. However, a display mode of the icon image Pi is not variable even if the imaging position or the imaging direction changes. The display mode of the icon image Pi may be configured to be variable by a factor other than those factors.

Note that the virtual object VOB displayed by the display processing unit 23 may be either a personalized object or a fixed object not variable for each user. For example, the virtual object VOB such as a signboard representing a type of a store may be a fixed object not variable for each user, while the virtual object VOB for presenting a recommended menu of a store may be personalized on the basis of information indicating preferences of each user.

4. Example Cases

Respective example cases of the processes executed by the smartphone 1 will be described.

<4-1. First Case>

A first case causes the display unit 10 to display an augmented reality space where the virtual object VOB for alerting the user is arranged.

Figure 4:
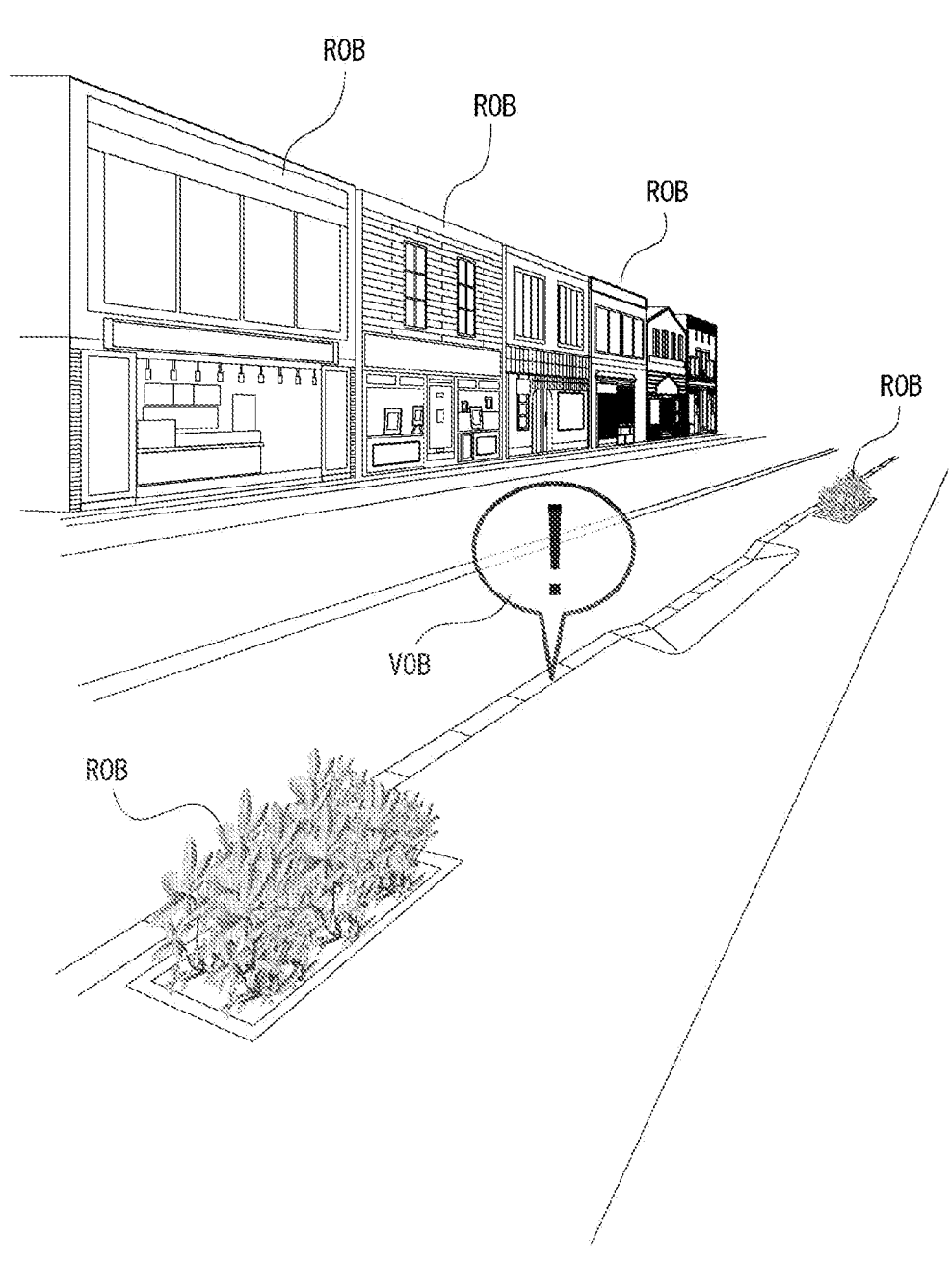
FIG. 4 is a diagram depicting a display example of an augmented reality space in a first case.

FIG. 4 depicts an example of this case. FIG. 4 depicts a part of the display unit 10 of the smartphone 1 carried by the user walking along a roadside, and illustrates a state where an augmented reality space is displayed on the display unit 10.

The one virtual object VOB is displayed on the display unit 10 together with the real objects ROB representing garden plants on a sidewalk and objects present on the opposite side of a roadway.

The virtual object VOB is an object for alerting the user to the presence of a step near the user, and is superimposed on a step portion located on the boundary between the roadway and the sidewalk.

Such display is achievable on the basis of distance data output from the distance sensor 8 included in the second sensing unit 3. In some cases, the presence or absence of a step is difficult to identify on the basis of captured image data output from the image sensor 5. Even in such a case, the presence or absence of a step can appropriately be determined on the basis of the distance data.

<4-2. Second Case>

A second case displays information provided for the user as information superimposed on the real object ROB such as a wall.

Figure 5:
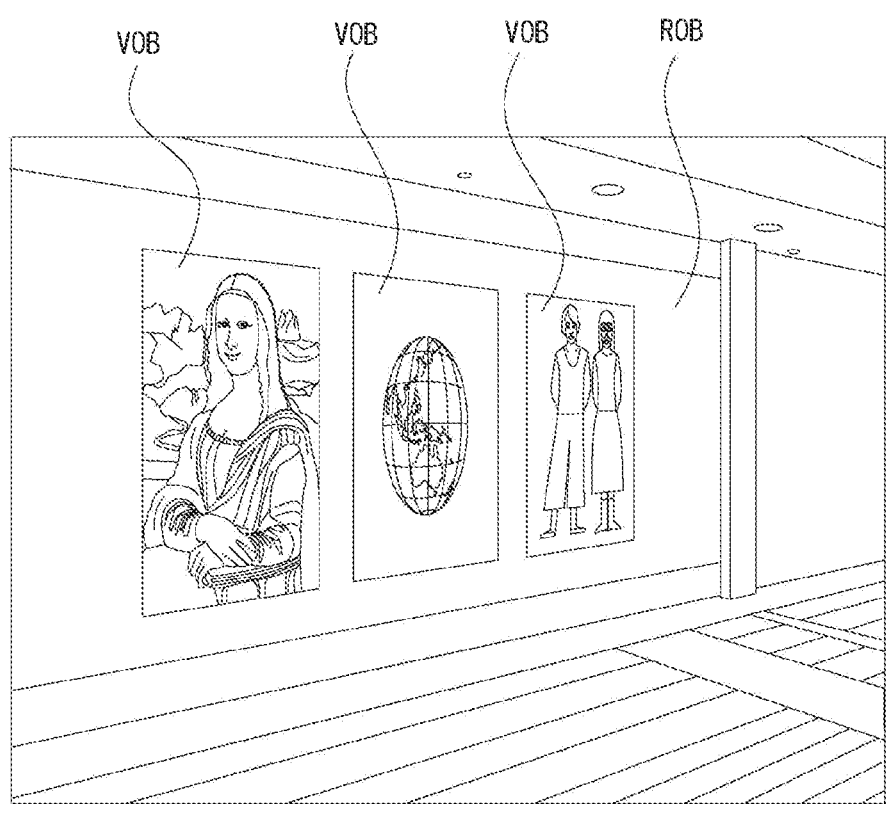
FIG. 5 is a diagram depicting a display example of an augmented reality space in a second case.

An example depicted in FIG. 5 is an example where virtual objects VOB representing posters each including an advertisement are superimposed on a wall. The virtual objects VOB are superimposed not only simply within a region where the wall is displayed, but also at locations according to the direction of the wall in such a manner as not to give a sense of strangeness, i.e., in a manner as if real objects were actually present in that area.

Such display mode is achievable on the basis of distance data output from the distance sensor 8 included in the second sensing unit 3. Specifically, the wall direction is identifiable on the basis of distance information obtained from the distance sensor 8. Accordingly, the virtual objects VOB can be arranged in appropriate directions corresponding to the wall direction.

Such display process allows the user to appreciate the virtual objects VOB in a natural manner without feeling a sense of strangeness.

<4-3. Third Case>

A third case changes a display mode of the virtual objects VOB on the basis of distance data. As an example, the sizes of the virtual objects VOB on the display are changed on the basis of distance data.

FIG. 6 depicts an augmented reality space displayed on the display unit 10 of the smartphone 1, and illustrates a state where roadside stores form a line on each of roadsides. Images of the respective stores are displayed on the basis of the real objects ROB. Among the real objects ROB on the right side of the road, the real object ROB located on the front side is assumed to be a real object ROB1, and the real object ROB located on the rear side is assumed to be a real object ROB2. In addition, among the real objects ROB on the left side of the road, the real object ROB located on the front side is assumed to be a real object ROB3, and the real object ROB located on the rear side is assumed to be a real object ROB4.

Moreover, FIG. 6 depicts a virtual object VOB1 which imitates a logo of a store representing the real object ROB1, and is arranged as a signboard hung at a store front. Similarly, a virtual object VOB2 imitates a logo of a store representing the real object ROB2, and is arranged as a signboard.

On the basis of distance data output from the distance sensor 8 of the smartphone 1, it is identified that the real object ROB1 is located before the real object ROB2.

Accordingly, the virtual object VOB1 associated with the real object ROB1 is displayed in a size larger than the virtual object VOB2 associated with the real object ROB2.

As described above, the display processing unit 23 of the smartphone 1 performs the display process which increases the size of the display of the virtual object VOB superimposed on the real object ROB located on the front side. This process allows the user to intuitively obtain a correct sense of distance to the virtual object VOB. Specifically, this process achieves presentation of the virtual object VOB without giving a sense of strangeness to the user.

<4-4. Fourth Case>

A fourth case performs a display process for the specific real objects ROB by using the virtual objects VOB in a case where the specific real objects ROB are identified.

Specifically, described will be a case which superimposes the virtual objects VOB in a case where persons or parts of persons are identified.

For example, suppose that a different user not desiring to appear in the screen of the smartphone 1 is present in this screen in a case where the user of the smartphone 1 is visually recognizing an augmented reality space via the smartphone 1. The different user does not desire to appear in the screen because there is a possibility that the user visually recognizing the augmented reality space is recording a video or distributing a recorded video in real time. For giving consideration to the user not desiring to appear in a video or the like, the smartphone 1 performs a process for achieving superimposed display of the virtual objects VOB in such a manner as to prohibit identification of persons on the basis of corresponding portions in a case where humans or parts of the bodies of the humans are detected within the augmented reality space.

As an example, the virtual object VOB imitating a character image, such as a dog and a cat, is superimposed on a face portion of a person. Alternatively, a state where image data corresponding to the face portion of the person is blacked out or a state of mosaic processing applied to the face portion may be displayed.

In addition, considering a possibility that a person is identifiable on the basis of his/her hand or leg as well as his/her face, a similar display process may be performed for some parts of the body such as exposed hands and legs.

Further, considering a possibility that a person is identifiable on the basis of his/her clothes or the like, a similar display process may be performed for a whole region containing a human body regardless of whether or not each portion is covered with clothes.

Figure 8:
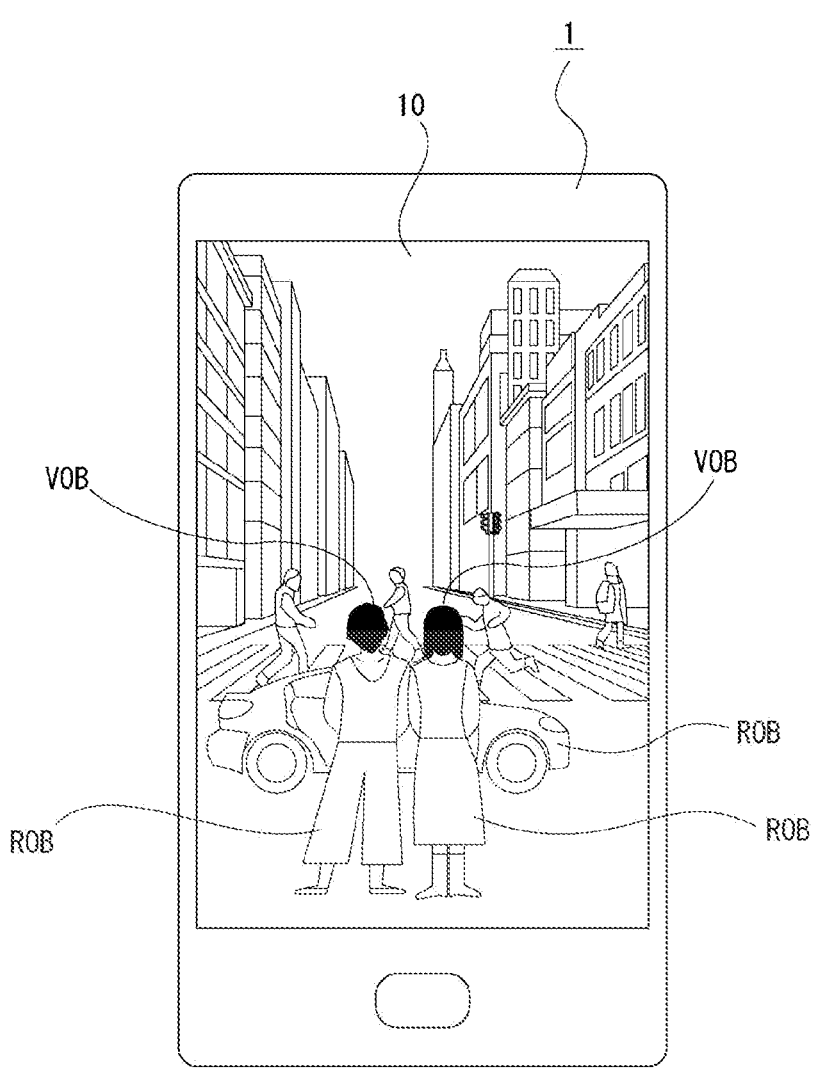
FIG. 8 is a diagram depicting a display example of an augmented reality space in the fourth case and illustrating a state where the display process has been applied to the human bodies.

FIG. 7 depicts a state of the display unit 10 of the smartphone 1, the display unit 10 displaying an augmented reality space in which the above-described processing has not yet been performed for parts of human bodies. Meanwhile, FIG. 8 depicts a state of the display unit 10 of the smartphone 1, the display unit 10 displaying an augmented reality space where parts of the human bodies are blacked out.

Whether or not the real object ROB is a part of a human body can be determined on the basis of distance data output from the distance sensor 8 included in the second sensing unit 3. Specifically, the shape of the real object ROB is identifiable on the basis of the distance data. Thereafter, whether or not the real object ROB is a part of a human body can be determined by calculating a degree of agreement between the identified shape of the real object ROB and shape data associated with faces, hands, legs, or other portions of bodies of humans and stored in the smartphone 1 or the server device 101.

While presented in this example has been the example of the second sensing unit 3 including the distance sensor 8, a similar determination process can be achieved by a thermosensor provided as the second sensing unit 3. Specifically, whether or not the real object ROB is a part of a human body can be determined on the basis of comparison between a temperature distribution or the like of the real object ROB and stored standard data. In addition, the real object ROB imitating a shape of a human, such as a mannequin, can be appropriately determined as an object not corresponding to a part of a human body on the basis of temperature information.

Note that the smartphone 1 operated by the user may execute a notification process for issuing a notification to the different user not desiring to appear within an angle of view of the smartphone 1. For example, in a case where the smartphone 1 displays an augmented reality space while imaging a real space, the control unit 9 may execute a process for lighting an LED (Light Emitting Diode) included in the smartphone 1 in a specific light emission pattern or light emission color.

In this manner, the different user that is present around the user is capable of moving out of the angle of view of the smartphone 1 to protect privacy.

Note that the light emission process described above may be performed on the basis of distance data obtained from the distance sensor 8. For example, this light emission process may be executed in a case where the real object ROB located within a predetermined distance (e.g., five meters) can be identified as a part of a human body. Accordingly, the necessity of executing the light emission process is eliminated in a case where the different user is detected but located far away. Hence, reduction of power consumption of the smartphone 1 is achievable.

5. Process Flow

Described will be a flowchart executed by the image processing unit 4 or the control unit 9 for practicing the first case to the fourth case described above.

Note that the image processing unit 4 and the control unit 9 will collectively and simply be referred to as a "processing unit" herein.

In Step S101 illustrated in FIG. 9, the processing unit acquires captured image data from the image sensor 5 of the first sensing unit 2.

In Step S102, the processing unit acquires distance data from the distance sensor 8 of the second sensing unit 3.

In Step S103, the processing unit generates display data as data to be displayed on the display unit 10, on the basis of the captured image data.

In Step S104, the processing unit determines whether or not the real object ROB designated as a target of superimposition by the virtual object VOB is present, on the basis of the distance data. Note that this determination process may be achieved with use of either only the captured image data or both the captured image data and the distance data.

The process in Step S104 will specifically be explained. It is determined whether or not a step is present around the user, on the basis of the distance data acquired from the distance sensor 8 in the first case, for example. Moreover, steps designated as targets among multiple steps around the user may be narrowed down on the basis of the distance data. Specifically, a step determined to be located within a predetermined distance from the user may be selected as a target of superimposition by the virtual object VOB.

Moreover, the determination process in the second case is a process for determining whether or not a wall, a ceiling, a floor, or the like available as an optimum place for display of an advertisement is present. For example, this process may determine whether or not a wall or the like allowing superimposition by the virtual object VOB at an easily viewable angle for the user is present, on the basis of the distance data. Moreover, this process may exclude a wall where the real object ROB such as a poster is already attached or a ceiling where a fluorescent light, an air conditioner, or the like is disposed.

Further, the determination process in the third case is a process for determining whether or not a store considered to be suitable for display of a signboard or the like as the virtual object VOB is located within an angle of view. The store considered to be suitable for display of a signboard or the like is a store in business, a store meeting preference information associated with the user, or a store located within a predetermined distance, for example. Moreover, a store which has useful information for the user, such as time sale information, may be designated.

Finally, the determination process in the fourth case is a process for determining whether or not a face of a person is present within an angle of view. Note that, as described above, this process may determine whether or not a face in a direction of a predetermined angle is present, or whether or not a face located within a predetermined distance is present. Moreover, this process may determine whether or not a part of a human body including a face is present.

In a case of determining in Step S104 that the target real object ROB is present, the processing unit acquires or generates the virtual object VOB in Step S105.

For example, in the first case, the processing unit acquires three-dimensional model information associated with the virtual object VOB having a balloon shape for a step alert.

Moreover, in the second case, the processing unit acquires three-dimensional model information associated with a poster, and acquires letter information to be superimposed on the poster from an advertisement server or the like. Thereafter, the processing unit combines the letter information with the three-dimensional model to generate the virtual object VOB.

Further, in the third case, the processing unit acquires three-dimensional model information associated with the virtual object VOB imitating a signboard of a store.

In the fourth case, the acquisition process in Step S105 need not be performed depending on cases. If a face or a part of a human body is blacked out as described above, the process in Step S105 is unnecessary. Alternatively, if the virtual object VOB is arranged in such a manner as to cover a face of a detected human with a mask imitating a face of an animal as a different mode of the fourth case, the processing unit acquires three-dimensional model information associated with the virtual object VOB representing the mask.

In the manner described above, the processing unit acquires information or performs a generation process associated with the virtual object VOB obtained from a different information processing device. Note that execution of the generation process is not necessarily required.

Information indicating a current position of the user, a current time, or the like may be added to the virtual object VOB to be acquired or the virtual object VOB to be generated herein. For example, for a spot where a lot of traditional buildings are located, such as Kyoto, the virtual object VOB in a mode not damaging an atmosphere of that spot (e.g., Japanese taste object) may be acquired or generated.

Moreover, in a case where the current time is nighttime, the virtual object VOB imitating a neon signboard may be acquired or generated.

In Step S106, the processing unit determines a display position, a display angle, a size, and the like of the virtual object VOB. For example, for an advertisement poster superimposed on a wall or the like, the processing unit determines the display angle of the virtual object VOB in consideration of the direction or the like of the wall to produce a view as if the poster were attached to the wall. Moreover, for a three-dimensional model signboard or the like, the processing unit determines the display size of the virtual object VOB such that the size increases as the distance to the corresponding store decreases.

Note that the size of the virtual object VOB to be determined is not limited to the size of the virtual object VOB on the display, i.e., the size of an image area occupied by the virtual object VOB on the display unit 10, and may be an absolute size of the three-dimensional model of the virtual object VOB. In addition, in this case, the sizes of the three-dimensional models of the virtual objects VOB of the respective stores may be equalized regardless of the distances to the stores. When the sizes of the three-dimensional models are equalized, the three-dimensional model located closer is necessarily displayed in a larger size.

Moreover, if the process for blacking out a face of a person is performed in the fourth case, the process in this step is a process for identifying an image area containing the face.

In Step S107, the processing unit performs a process for updating display data. For example, this process executes an occlusion process for the real object blocked by the virtual object VOB.

In addition, a shading process considering an entrance quantity of real light may be executed.

In Step S108, the processing unit performs a display control process. This process causes the display unit 10 to display an image of the real object ROB on which the virtual object VOB is superimposed.

Note that, in a case where the real object ROB as a target of superimposition by the virtual object VOB is determined, in Step S104, to be absent, a display control process for the real object ROB, i.e., a process for displaying what is generally called a through image on the display unit, is executed in Step S108.

6. Second Embodiment

Described will be an example of a smartphone 1A in a second embodiment which is different from the first embodiment in that the second sensing unit 3 has a sensor different from the distance sensor 8.

Figure 10:
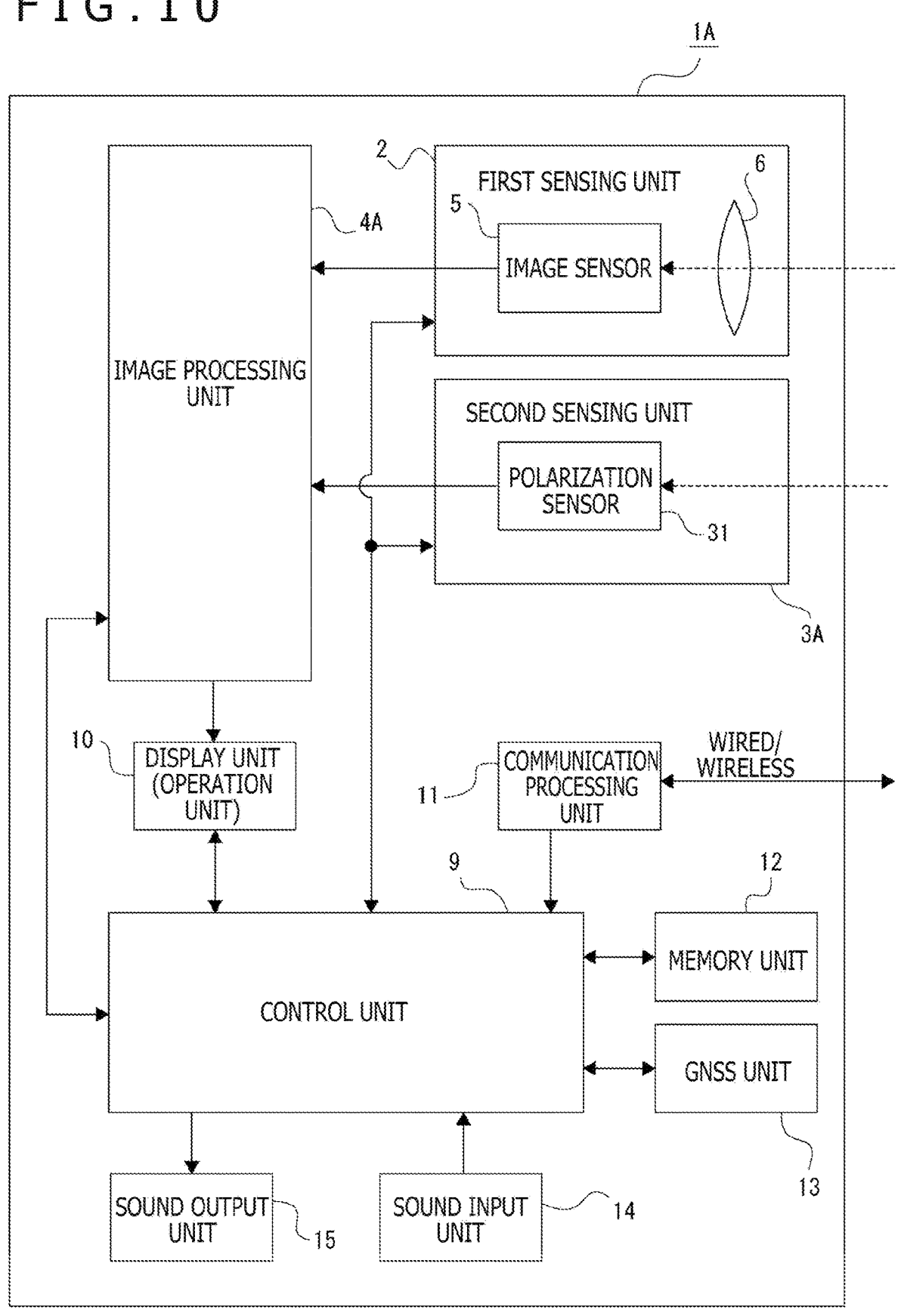
FIG. 10 is a block diagram depicting a configuration example of an image processing apparatus according to a second embodiment.

A second sensing unit 3A according to the second embodiment includes a polarization sensor 31 as depicted in FIG. 10. In addition, unlike in the first embodiment, the second sensing unit 3A does not include the light emitting unit 7.

The polarization sensor 31 is a mode of a sensor capable of identifying a material of the real object ROB. Specifically, in a case where the real object ROB including a glass material or the like is present, the polarization sensor 31 outputs, as second sensing data, polarization data on the basis of which glass as the material of the real object ROB is identifiable.

Figure 11:
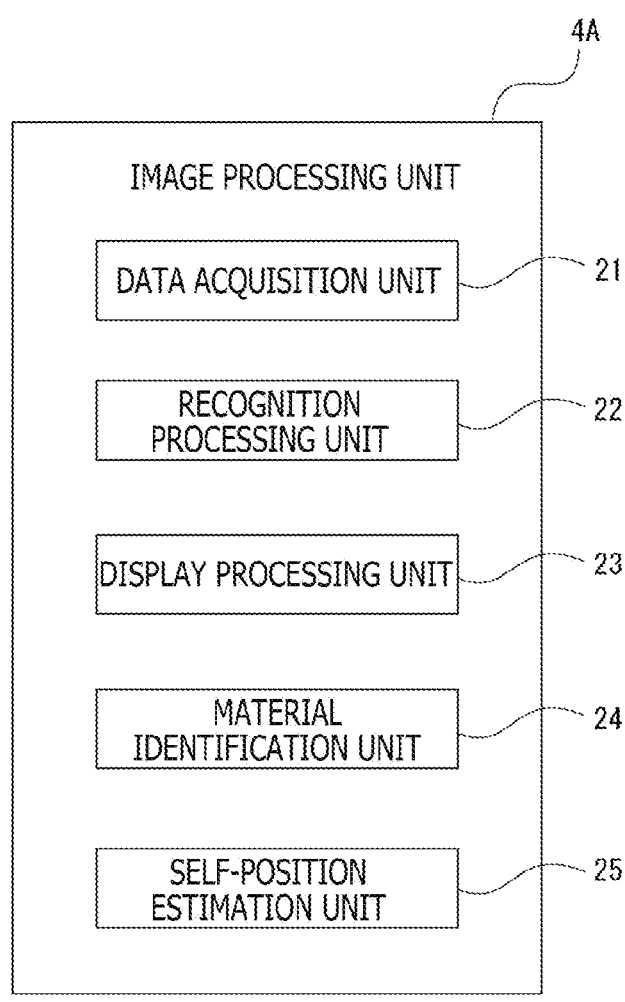
FIG. 11 is a functional block diagram of an image processing unit according to the second embodiment.

As depicted in FIG. 11, an image processing unit 4A of the smartphone 1A includes the data acquisition unit 21, the recognition processing unit 22, the display processing unit 23, a material identification unit 24, and a self-position estimation unit 25.

Note that the self-position estimation unit 25 may be eliminated as will be described below.

Processes performed by the data acquisition unit 21, the recognition processing unit 22, and the display processing unit 23 are similar to the processes performed by the data acquisition unit 21, the recognition processing unit 22, and the display processing unit 23 in the first embodiment, and therefore will not be repeatedly described in detail.

As described above, the material identification unit 24 is capable of identifying the real object ROB including the glass material, on the basis of the polarization data as the second sensing data.

In a case where the real object ROB is identified as a glass door, the data acquisition unit 21 acquires information associated with the virtual object VOB, such as an advertisement, superimposed on the glass door.

The display processing unit 23 performs a display process considering a display mode of the virtual object VOB on the basis of identified material information. As an example, in a case where the real object ROB is identified as a glass door, the display processing unit 23 performs a process for displaying the virtual object VOB, such as an advertisement, to be superimposed on the glass door in a semitransparent state (see FIG. 12). This process achieves display allowing visual recognition of the real object ROB located on the opposite side of the glass door through the virtual object VOB and the real object ROB.

The self-position estimation unit 25 performs a process for estimating a position of the smartphone 1 as a self-position. For example, the self-position estimation unit 25 identifies a rough position by using position information acquirable from the GNSS unit 13 included in the smartphone 1A, and estimates further detailed position information on the basis of the material information associated with the real object ROB and identified by the material identification unit 24.

For example, it is assumed that a floor where the smartphone 1A is located in a building is not identifiable even with use of the position information acquirable from the GNSS unit 13. Accordingly, detailed position information associated with location of the smartphone 1A is estimated (corrected) on the basis of information indicating a position, a size, a shape, and the like of the real object ROB including the glass material. In a case where the real object ROB including the glass material and having a specific size is present only on a specific floor, or in a case where the real object ROB including the glass material and having a specific shape is present only on a specific floor, the floor of the smartphone 1A is identifiable on the basis of these items of information indicating the real objects ROB.

In the manner described above, the smartphone 1A is allowed to identify the floor which is not identifiable on the basis of information obtained from the GNSS unit 13. Note that the material information need not be referred to in a case where the floor is identifiable on the basis of only the position, the size, or the shape of the real object ROB.

A flow of a process executed by a processing unit (the image processing unit 4, the control unit 9, and the like) according to the second embodiment will be described with reference to FIG. 13. Note that processes similar to the processes in the first embodiment are given identical reference signs, and will not be repeatedly described where appropriate.

The processing unit acquires captured image data by executing a process in Step S101. Thereafter, the processing unit acquires polarization data as the second sensing data from the polarization sensor 31 in Step S110.

By executing the respective processes in Steps S103 and S104, the processing unit generates display data on the basis of the captured image data, and determines whether or not the real object ROB requiring superimposition by the virtual object VOB is present.

At this time, in a case where the estimation process for estimating the self-position has been executed by the self-position estimation unit 25, the estimated self-position information is referred to for determining in Step S104 whether or not the real object ROB requiring superimposition by the virtual object VOB is present.

For example, in a case of presenting to the user such information associated with a store A located on a second floor of a shopping mall where the user is currently shopping, it is possible that information indicating that the store A is located on the second floor is superimposed as the virtual object VOB. For this purpose, it is possible that a notification also containing a route for going up (down) to the second floor is issued. However, in a case where this user is already located on the second floor, such a manner of information presentation is unnecessary.

At this time, in a case where the fact that the user is already located on the second floor is recognized on the basis of the self-position estimation process performed by the self-position estimation unit 25, information indicating that the store A is located on the second floor, a guide to a position of an elevator used for going down to the second floor, and the like are unnecessary. In this case, a route from a current place to the position of the store A (i.e., two-dimensional route) is only required to be presented.

Accordingly, letter information displayed with the presented virtual object VOB can be reduced, and therefore, information presentation easy to read for the user is achievable.

In a case where the corresponding real object ROB is absent, the processing unit advances the process to Step S108 to perform a process for causing the display unit 10 of the smartphone 1A to display a through image.

On the other hand, in a case where the corresponding real object ROB is present, the processing unit advances the process to Step S105 to acquire or generate the virtual object VOB.

In Step S111, the processing unit determines a display mode of the virtual object VOB on the basis of the polarization data. In this step, in the example described above, the processing unit performs a determination process for determining whether or not to display in a semitransparent state, for example. Note that it is possible that a similar process is carried out in a case where the virtual object VOB is superimposed on the real object ROB including a semitransparent material (e.g., transparent acrylic plate) other than the glass material.

The processing unit determines a display position, a display angle, a size, and the like of the virtual object by executing the process in Step S106.

The processing unit executes a process in Step S107 to perform a process for updating display data generated in Step S103. This update process generates display data for displaying an augmented reality space in which the virtual object VOB is arranged with the display mode determined in Step S111, and the display position, the display angle, the size, and the like determined in Step S106 being reflected.

Note that the second sensing unit 3 in the second embodiment may include a multispectral sensor instead of the polarization sensor 31.

The multispectral sensor is a sensor which outputs multispectral image data on the basis of which spectrum reflection characteristics of the real object ROB are recognizable.

Even in this case, the material of the real object ROB is similarly identifiable on the basis of the second sensing data.

Specifically, the spectrum reflection characteristics of the real object ROB vary according to the material, the color, or the like of the real object ROB. Material information and color information associated with the real object ROB can be obtained by matching between these various characteristics and information output from the multispectral sensor.

In addition, the display processing unit 23 may determine the display mode of the virtual object VOB to be superimposed, on the basis of the material information associated with the real object ROB.

For example, in a case where the real object ROB is a wooden wall, a display mode to be adopted is such a mode where the virtual object VOB as an advertisement poster is affixed to the wall via thumbtacks. In a case where the real object ROB is a glass wall, a display mode to be adopted is such a mode where the virtual object VOB as an advertisement poster is affixed to the wall via tapes. In a case where the real object ROB is a metal wall, a display mode to be adopted is such a mode where the virtual object VOB as an advertisement poster is affixed to the wall via magnets.

By changing the display mode in the manner described above, display of the virtual object VOB full of reality is achievable.

Note that, while the first sensing data and the second sensing data are acquired from the first sensing unit 2 and the second sensing unit 3, respectively, in the first embodiment and the second embodiment, the smartphone 1 (1A) may be configured to acquire the two types of sensing data from one sensing unit.

Specifically, the image sensor 5 of the first sensing unit 2 may be configured to output distance data as the second sensing data as well as captured image data as the first sensing data. The image sensor 5 is capable of outputting a signal on the basis of which an amount of defocus using what is generally called a contrast method can be calculated according to movement of a focus lens included in the imaging optical system 6. In addition, the defocus amount is dependent on a distance to a subject. Accordingly, the image sensor 5 is considered to be capable of outputting second sensing data on the basis of which distance data can be calculated.

Moreover, material information is acquirable for each of the real objects ROB if inference using deep learning is made on the basis of captured image data output from the image sensor 5 of the first sensing unit 2. Accordingly, the captured image data may be considered as information on the basis of which material information is identifiable. The image sensor 5 in this case may be considered as a sensor functioning as the first sensing unit 2 capable of outputting captured image data as the first sensing data, and also functioning as the second sensing unit 3 capable of outputting data on the basis of which the material is identifiable as the second sensing data.

Note that, if inference using deep learning is made, captured image data output from the image sensor 5 of the first sensing unit 2 may be considered as the second sensing data on the basis of which distance data can be calculated. Specifically, distance data for each of the real objects ROB can be extracted by performing a process for inferring each distance to the real objects ROB on the basis of the position, the size, or the like of each of the real objects ROB in a target image based on the captured image data.

7. Third Embodiment

In a third embodiment, the smartphone 1 having the configuration depicted in FIG. 2 is configured to perform two types of operations for the virtual object VOB. However, as will be described below, the smartphone 1 in the third embodiment includes an image processing unit 4B.

This embodiment will specifically be described with reference to the accompanying drawings.

Figure 14:
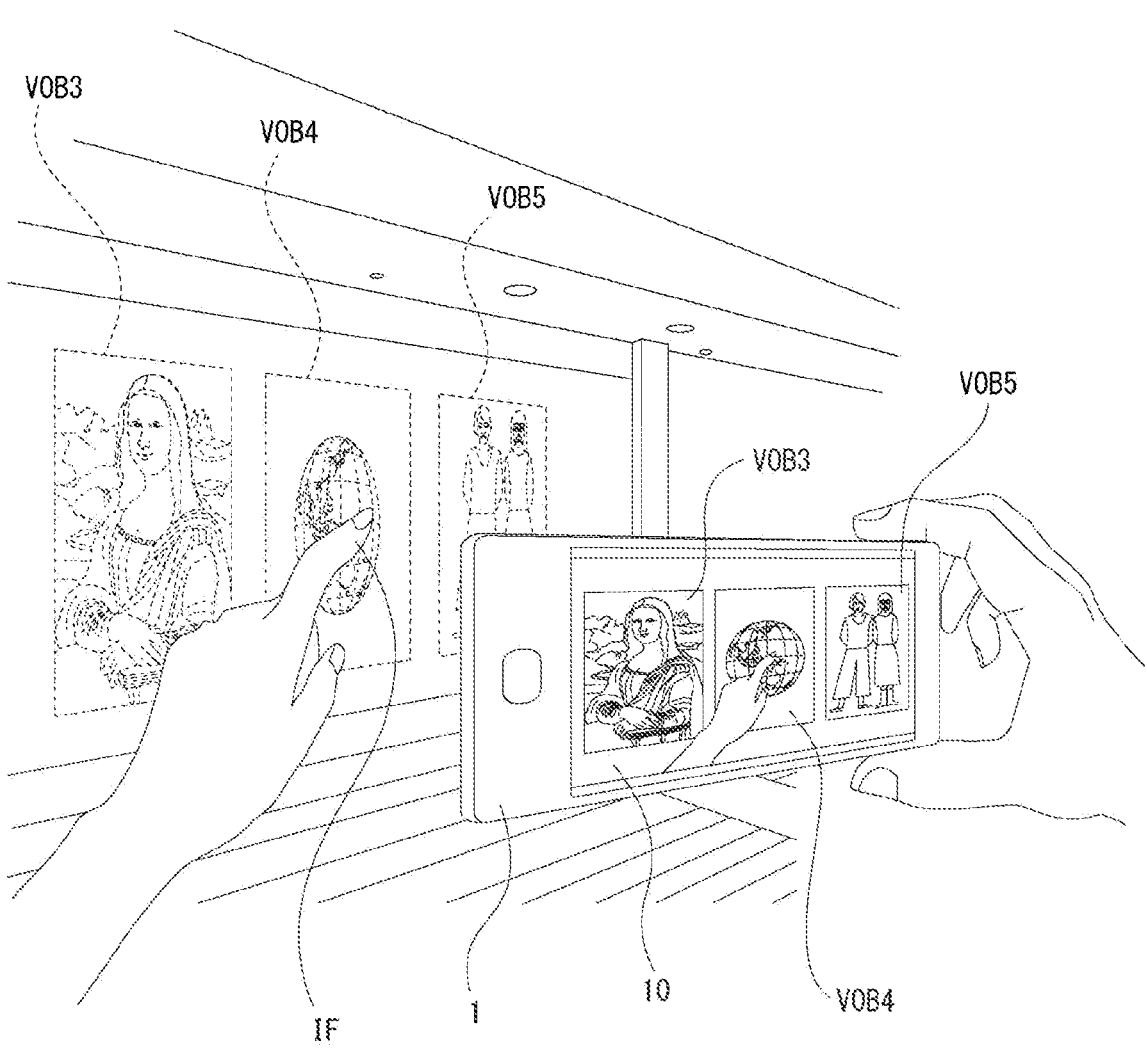
FIG. 14 is a diagram depicting a display example of an augmented reality space when a first operation is conducted in a third embodiment.

FIG. 14 depicts an operation mode of a first operation included in two types of operations acceptable by the smartphone 1 according to the third embodiment.

FIG. 14 depicts a state where the smartphone 1 is capturing images of three virtual objects VOB3, VOB4, and VOB5 that each have a poster shape and are arranged in an augmented reality space. In addition, each of the virtual objects VOB3, VOB4, and VOB5 not present in a real space is indicated by a dotted line. However, the virtual objects VOB3, VOB4, and VOB5 are each indicated by a solid line on the display unit 10 of the smartphone 1 displaying the augmented reality space where the virtual objects VOB are arranged.

As depicted in the figure, the first operation is an operation for selecting the virtual object VOB according to movement of a predetermined portion of the user in the augmented reality space. An index finger IF of the user is adopted herein as an example of the predetermined portion of the user.

Specifically, the index finger IF in the augmented reality space moves according to movement of the index finger IF by the user in the real space. Thereafter, the one virtual object VOB4 is selected according to movement of the index finger IF in the augmented reality space. This series of movement constitute the first operation. In other words, the first operation is an operation for allowing the user to feel as if the finger directly touched the virtual object VOB that is arranged in the augmented reality space but that is difficult to directly touch in reality. In addition, this operation is also considered to be an operation for bringing an image region of the index finger IF displayed on the display unit 10 into contact with an image region containing display of the virtual object VOB.

Note that the first operation may select multiple virtual objects VOB instead of one virtual object VOB.

The virtual object VOB selected by the first operation of the user is identified on the basis of captured image data output from the image sensor 5. The user moves the index finger IF of the user in such a manner as to touch the virtual object VOB displayed on the display unit 10 of the smartphone 1. Accordingly, it is preferable that the virtual object VOB be identified on the basis of the captured image data.

Figure 15:
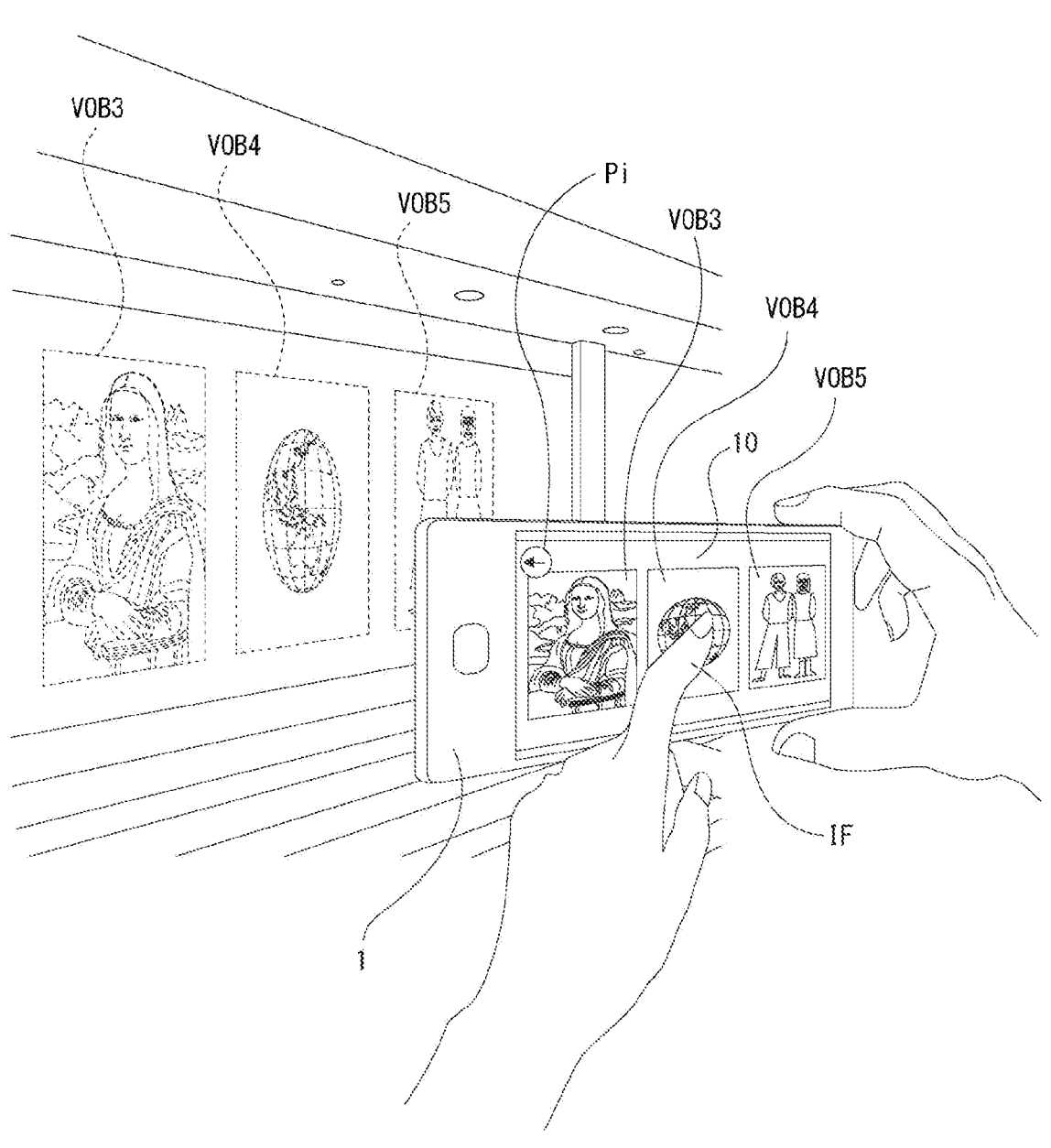
FIG. 15 is a diagram depicting a display example of an augmented reality space when a second operation is conducted in the third embodiment.

FIG. 15 depicts an operation mode of a second operation as one of the two types of the operations acceptable by the smartphone 1 according to the third embodiment.

As depicted in the figure, the augmented reality space where the virtual objects VOB3, VOB4, and VOB5 are arranged is displayed on the display unit 10 of the smartphone 1. The user performs a touch operation for touching the display unit 10 functioning as an operation unit, in such a manner as to touch the virtual object VOB4 displayed on the display unit 10. This touch operation constitutes the second operation.

By achieving at least two types of the operations described above, i.e., the first operation for allowing the user to feel as if the finger touched the virtual object VOB and the second operation as the touch operation for touching the display unit 10, user friendliness improves. Specifically, ease of operations of the smartphone 1 is variable according to a position of the smartphone 1, a distance to the user, and surrounding sceneries and circumstances. The present technology contributes to improvement of operability for the user by practicing the above two operations.

Several types of operations are adoptable as the touch operation. For example, a single tap operation, a double tap operation, a swipe operation, a flick operation, a scroll operation, a drag operation, a pinch-in operation, and a pinch-out operation are adoptable.

In the following description, a mode for accepting the first operation will be referred to as a first mode, while a mode for accepting the second operation will be referred to as a second mode.

Figure 16:
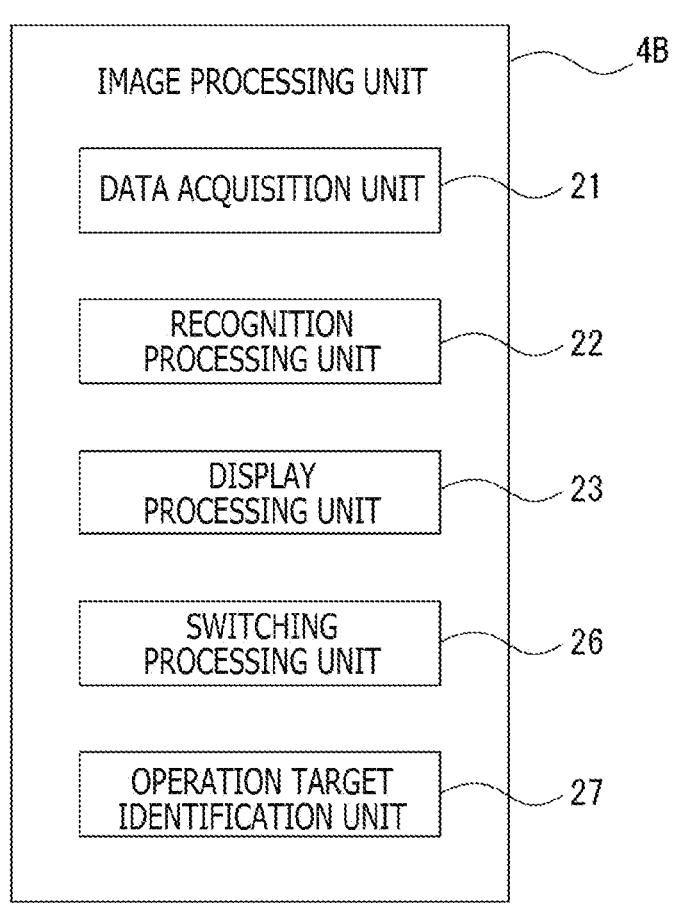
FIG. 16 is a functional block diagram of an image processing unit according to the third embodiment.

FIG. 16 depicts a functional configuration of the image processing unit 4B included in the smartphone 1 which accepts the first operation and the second operation.

As depicted in the figure, the image processing unit 4B includes the data acquisition unit 21, the recognition processing unit 22, the display processing unit 23, a switching processing unit 26, and an operation target identification unit 27.

The data acquisition unit 21 acquires captured image data as the first sensing data from the first sensing unit 2 and distance data as the second sensing data from the second sensing unit 3.

The recognition processing unit 22 performs a process for recognizing the real object ROB within an angle of view on the basis of the captured image data and the distance data. Moreover, the recognition processing unit 22 is capable of identifying a shape and the like of the real object ROB on the basis of the distance data.

Further, the recognition processing unit 22 according to the present embodiment performs a process for recognizing the index finger IF of the user. Either the captured image data or the distance data is available for performing the process for recognizing the index finger IF of the user.

The display processing unit 23 executes a process for causing the display unit 10 to display an augmented reality space. As in each of the above examples, display objects such as the real object ROB, the virtual object VOB, and the icon image Pi are displayed on the display unit 10 by the display process performed by the display processing unit 23.

The switching processing unit 26 executes a process for switching between the first mode and the second mode. The switching process is performed on the basis of information obtained by image processing applied to the captured image data as the first sensing data, for example.

In a case where the finger of the user carrying the smartphone 1 can be identified from the captured image data, for example, the switching processing unit 26 performs a process for transitioning to the first mode, on the basis of recognition of detection that the user attempts to conduct the first operation.

Note that the switching processing unit 26 may be included in the control unit 9. In this case, the switching processing unit 26 of the control unit 9 performs a process for switching between the first mode and the second mode, on the basis of information that is output to the control unit 9 and that indicates that the image processing unit 4B has recognized the index finger IF as the predetermined portion of the user.

In a case where the user has conducted the first operation or the second operation, the operation target identification unit 27 performs a process for identifying, as a target of the conducted operation, the virtual object VOB selected by the user as the target of the operation.

For example, the identification process for identifying the operation target is achieved on the basis of the captured image data as the first sensing data output from the first sensing unit 2. Alternatively, the identification process for identifying the operation target may be achieved with use of the distance data as the second sensing data output from the second sensing unit 3. For example, the identification process may be executed on the basis of the captured image data after narrowing down to the virtual objects VOB located within a predetermined distance from the user. This is because the virtual object VOB designated as the operation target for the user is often located near the user, and accordingly, if the virtual object VOB located far away is identified as the operation target, a process not intended by the user is highly likely to be executed.

Each of example cases of the processes executed by the smartphone 1 according to the third embodiment will be described herein.

<7-1. Fifth Case>

A fifth case is a case where the smartphone 1 executes a process for detecting the index finger IF of the user, and a process for switching between the first mode and the second mode according to a detection result.

Figure 17:
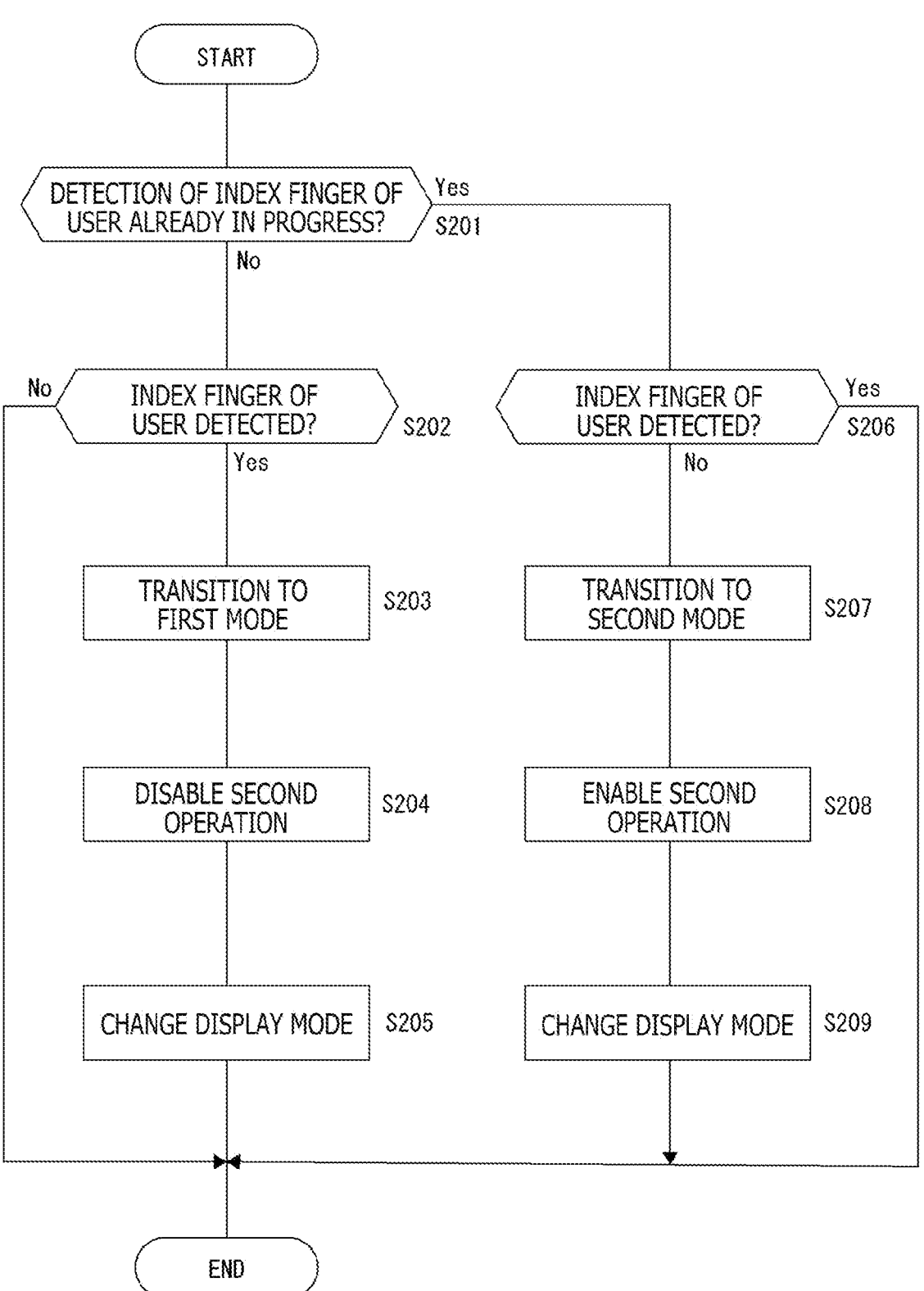
FIG. 17 is a flowchart for explaining a processing example executed by a processing unit in a fifth case.

FIG. 17 depicts an example of processes executed by the smartphone 1. Note that the image processing unit 4B and the control unit 9 will collectively and simply be referred to as a "processing unit" as in the other cases described above.

In Step S201, the processing unit determines whether or not the detection of the index finger IF of the user is already in progress. A series of processes depicted in FIG. 17 are executed every time captured image data is acquired, i.e., for each frame obtained by the image sensor 5, for example. The determination process in Step S201 executed according to capture of a latest frame is a process for determining whether or not the index finger IF of the user has been detected in captured image data acquired one frame before the latest frame.

In a case of determining that the index finger IF of the user has not been detected yet (determination "No"), the processing unit determines in Step S202 whether or not the index finger IF of the user has been detected in captured image data as the latest frame. In a case of determination "Yes" in the determination process in Step S202, i.e., in a case where the new index finger IF of the user has been detected in the latest frame, the processing unit performs a transition process for transitioning to the first mode in Step S203.

Thereafter, the processing unit performs a process for disabling the second operation in Step S204. This process is a process for prohibiting acceptance of a touch operation for the display unit 10 of the smartphone 1.

In Step S205, the processing unit performs a process for changing a display mode of the virtual object VOB and the icon image Pi. The first operation is an operation performed by the user for selecting the virtual object VOB in consideration of a positional relation between the virtual object VOB displayed on the display unit 10 and a tip of the index finger IF of the user. In this case, there is a possibility that the display of the icon image Pi becomes an obstacle to the operation in comparison with the second operation for touching the virtual object VOB displayed on the display unit 10.

Accordingly, in the process in Step S205, the processing unit may execute a process for reducing the size of the icon image Pi or a process for hiding display of the icon image Pi.

Figure 18:
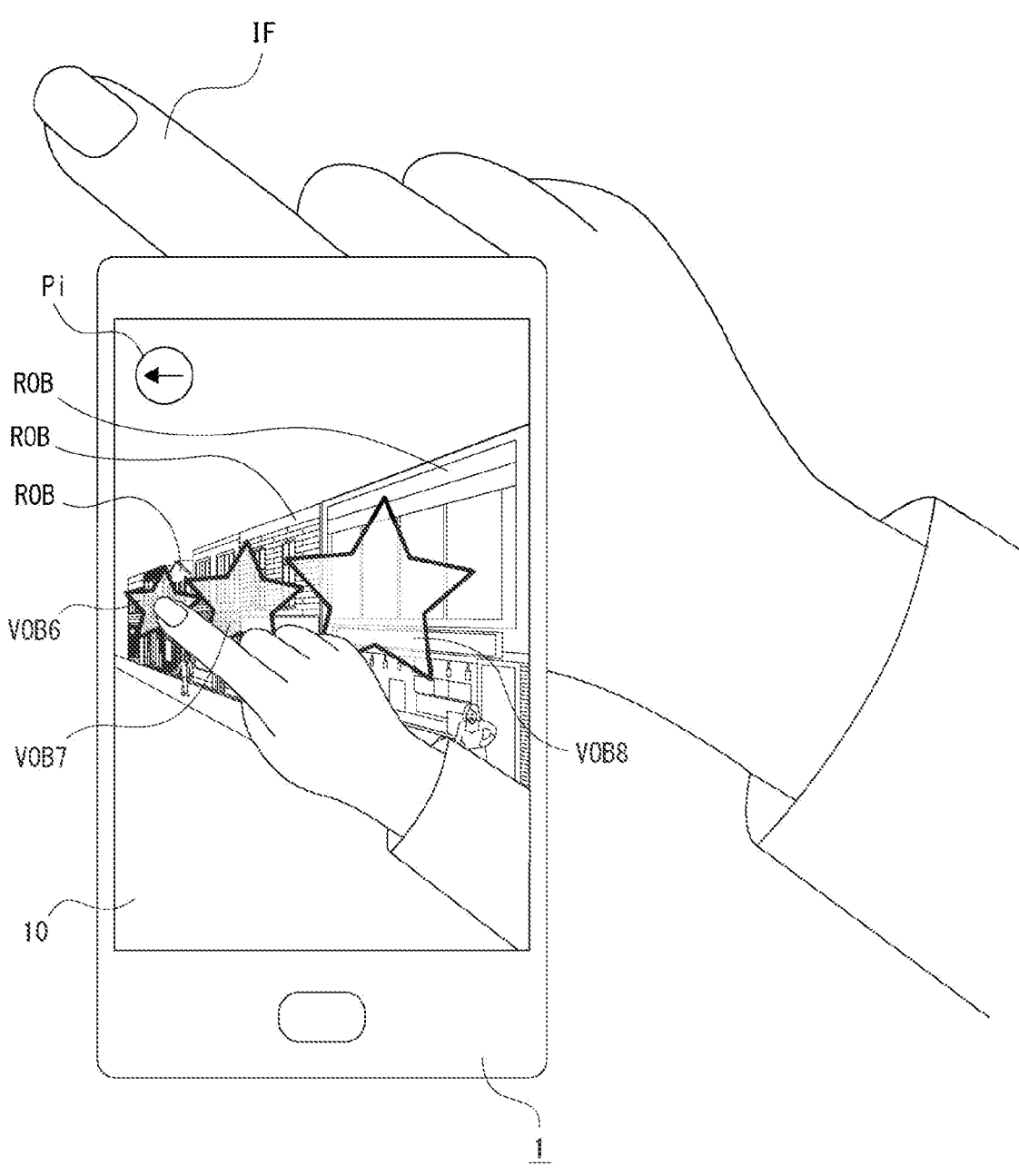
FIG. 18 is an explanatory diagram depicting a state before a change of a display mode of an augmented reality space for accepting the first operation in the fifth case.
Figure 19:
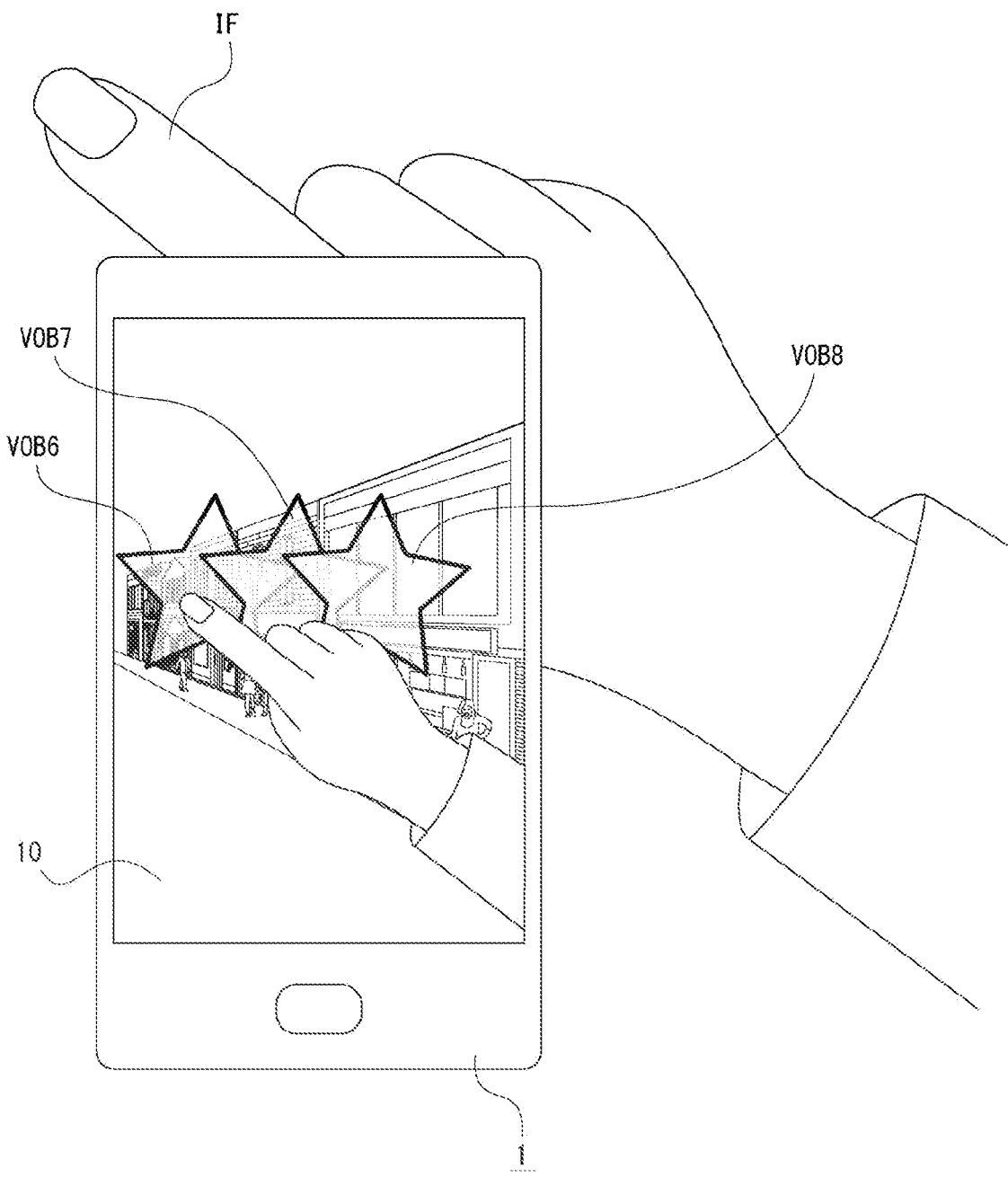
FIG. 19 is an explanatory diagram depicting a state after the change of the display mode of the augmented reality space for accepting the first operation in the fifth case.

This process will specifically be described with reference to FIGS. 18 and 19. FIG. 18 is a diagram depicting a state where the first operation is conducted to select, among virtual objects VOB6, VOB7, and VOB8, the virtual object VOB6 while the icon image Pi is displayed. On the other hand, FIG. 19 is a diagram depicting a state where the first operation is conducted while display of the icon image Pi is hidden.

In the manner described above, the operation for selecting the virtual object VOB is facilitated by hiding display of the icon image Pi.

Meanwhile, in a case where the size of the virtual object VOB is small on the display, there is a possibility that the second operation is difficult to conduct. For dealing with such a case, a process for increasing the size of the virtual object VOB may be executed in Step S205.

FIG. 18 depicts a state where the virtual objects VOB6, VOB7, and VOB8 are displayed in sizes corresponding to respective distances. In this state, the virtual object VOB6 is displayed in a small size, and therefore, the first operation for selecting the virtual object VOB6 is difficult to conduct in some cases. Accordingly, it is considered to adopt a manner of display depicted in FIG. 19 where the sizes of the virtual objects VOB6 and VOB7 are equivalent to the size of the virtual object VOB8. In this manner, the operation for selecting the virtual object VOB6 located farthest from the smartphone 1 is facilitated.

Note that the state depicted in FIG. 19 is a state where parts of the virtual objects VOB are hidden behind the index finger IF of the user. This state is achieved by designating the regions hidden by the index finger IF of the user as occlusion regions and carrying out an occlusion process to hide display of the portions disposed in the occlusion regions in the virtual objects VOB.

Moreover, the state depicted in FIG. 19 is a state where parts of the three virtual objects VOB6, VOB7, and VOB8 overlap with each other. The arrangement may be adjusted in such a manner as to eliminate overlap between the virtual objects VOB in order to facilitate the operation for selecting the virtual object VOB.

After completion of the process in Step S205, the processing unit ends the series of processes illustrated in FIG. 17.

In addition, in a case of determining in Step S202 that the index finger IF of the user has not been detected, i.e., in a case of determining that the state of no detection of the index finger IF of the user continues, the processing unit also ends the series of processes illustrated in FIG. 17. In this case, transition to the first mode does not take place, and the second mode continues.

On the other hand, in a case of determining in Step S201 that the current state is a state where detection of the index finger IF of the user is already in progress, i.e., in a case where transition to the first mode has already been completed, the processing unit advances the process to Step S206 to perform a process for determining whether or not the index finger IF of the user has been detected in the captured image data as the latest frame.

Here, in a case where the index finger IF of the user has been detected, i.e., in a case of determining that the state of detection of the index finger IF of the user continues, the processing unit ends the series of processes illustrated in FIG. 17 while continuing the first mode.

On the other hand, in a case of determining in Step S206 that the index finger IF of the user has not been detected, i.e., in a case of determining that the state of detection of the index finger IF of the user has changed to a state of no detection, the processing unit performs a transition process for transitioning to the second mode in Step S207.

The processing unit performs a process for enabling the second operation in Step S208, and changes a display mode in Step S209.

Figure 20:
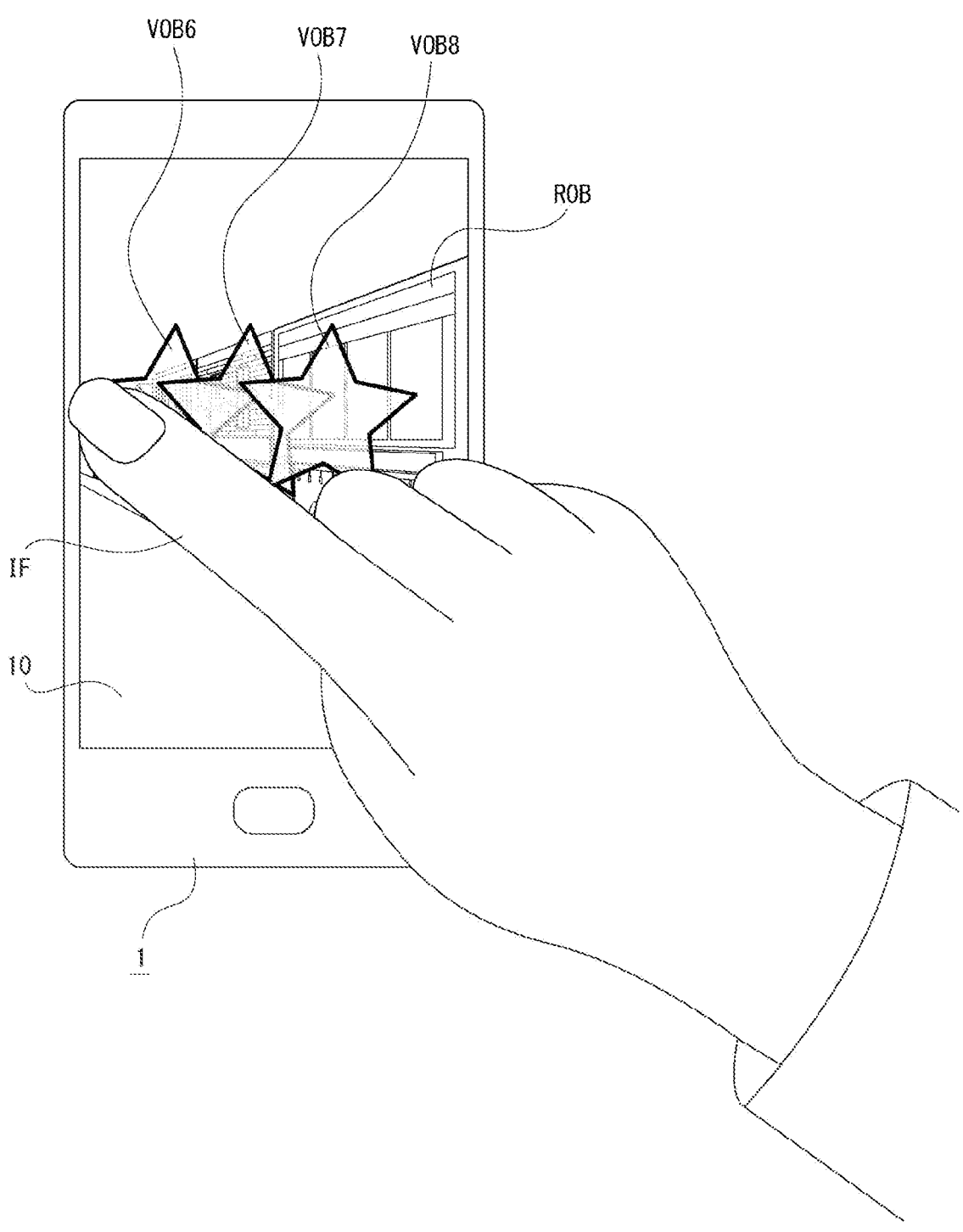
FIG. 20 is an explanatory diagram depicting a state before a change of a display mode of an augmented reality space for accepting the second operation in the fifth case.
Figure 21:
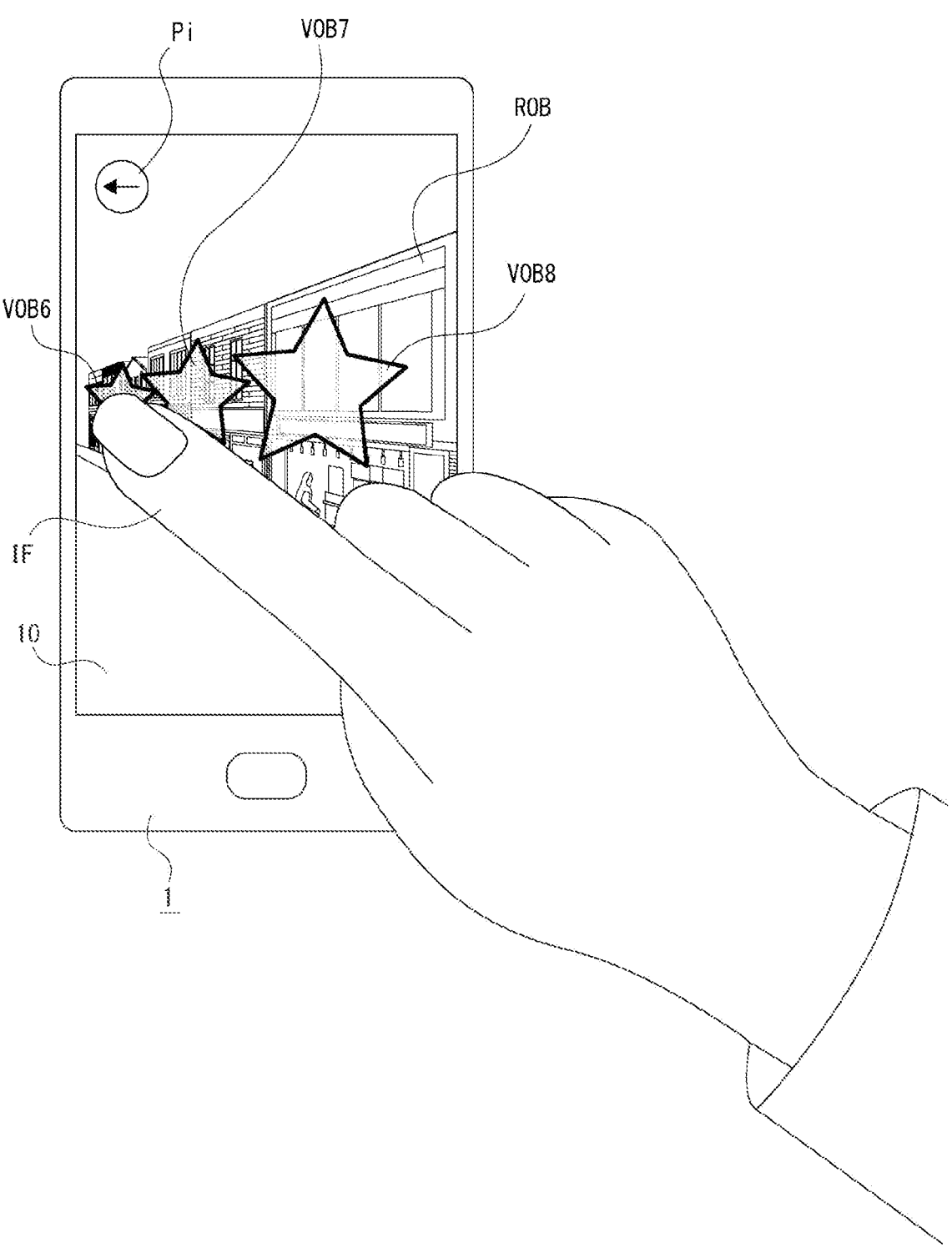
FIG. 21 is an explanatory diagram depicting a state after the change of the display mode of the augmented reality space for accepting the second operation in the fifth case.

For changing of the display mode in Step S209, the processing unit executes a process for returning to the state where the icon image Pi is displayed in a large size or a process for returning to the state where the virtual objects VOB6 and VOB7 are displayed in small sizes (or normal sizes). Accordingly, the display is changed from the state depicted in FIG. 20 to the state depicted in FIG. 21.

After completion of the process in Step S209, the processing unit ends the series of processes illustrated in FIG. 17.

Note that, while described with reference to FIG. 17 has been the example which executes Step S204 and Step S205 after completion of transition to the first mode in Step S203, one or some of the processes in Step S203, Step S204, and Step S205 may be configured to be executed.

Similarly, one or some of the processes in Step S207, Step S208, and Step S209 may be executed.

For example, in a case where the state of no detection of the index finger IF of the user is changed to the state of detection of the index finger IF of the user, only the process in Step S203 for transitioning to the first mode may be executed. In a case where the state of detection of the index finger IF of the user is changed to the state of no detection of the index finger IF of the user, only the process in Step S207 for transitioning to the second mode may be executed.

In these cases, the process for detecting the index finger IF of the user may be executed with a frequency different between the first mode and the second mode. Specifically, in the case of transition to the first mode, the frequency of execution of the process for detecting the index finger IF of the user or the process for identifying the position of the tip of the finger of the user may be raised to recognize movement of the index finger IF of the user with high accuracy. In the case of transition to the second mode, the frequency of execution of the process for detecting the index finger IF of the user may be lowered (e.g., once for every one-tenth of a second).

Alternatively, in the case where the state of no detection of the index finger IF of the user is changed to the state of detection of the index finger IF of the user, the process for transitioning to the first mode in Step S203 and the process for disabling the second operation in Step S204 may be executed without executing the process in Step S205. In the case where the state of detection of the index finger IF of the user is changed to the state of no detection of the index finger IF of the user, the process for transitioning to the second mode in Step S207 and the process for enabling the second operation in Step S208 may be executed without executing the process in Step S209.

While the example which has the first mode for accepting the first operation and the second mode for accepting the second operation has been described with reference to FIG. 17, a different mode such as a third mode may further be provided.

For example, the first mode may be a mode for accepting only the first operation, the second mode may be a mode for accepting only the second operation, and the third mode may be a mode for accepting each of the first operation and the second operation.

The following configuration may be adopted. The third mode is adopted for operation in an initial state. In a case where imaging of the index finger IF of the user is identified on the basis of image processing for captured image data, the mode transitions to the first mode. In a case where a touch operation performed by the user for the display unit 10 is detected, the mode transitions to the second mode. Thereafter, in a case where nothing is further detected any more, the mode may be configured to return to the third mode.

In this configuration, erroneous input by the user is prevented by the transition to the first mode and the second mode. Moreover, a standby state for handling any operation by the user is produced by the transition to the third mode.

In addition, registered data of the index finger IF of the user may be used for detection of the index finger IF of the user. For example, by registering only the right and left index fingers IF of the user possessing the smartphone 1, a possibility of erroneous detection of things that are similar to but different from the index fingers IF of this user and a possibility of erroneous detection of index fingers IF of other persons or other fingers (e.g., middle finger) can be eliminated. In this manner, a more appropriate process can be carried out.

A modification of the fifth case will be described.

While described with reference to FIG. 19 has been the example where a part of the virtual object VOB is hidden behind the index finger IF of the user in a case where the index finger IF of the user is located within the angle of view, the real objects ROB and the virtual objects VOB located in the occlusion regions hidden behind the index finger IF may be vaguely displayed by performing a process for converting the index finger IF of the user into a semi-transparent finger.

Such a display process is achievable by α-blending using captured image data obtained before an occlusion is caused in an occlusion region and captured image data as a latest frame after the occlusion is caused, for example.

Alternatively, α-blending may be carried out with use of image data obtained from a three-dimensional model acquired beforehand.

<7-2. Sixth Case>

A sixth case is a case where the smartphone 1 executes a process for detecting the first operation and the second operation conducted by the user and a process performed in correspondence with the detected operation.

Figure 22:
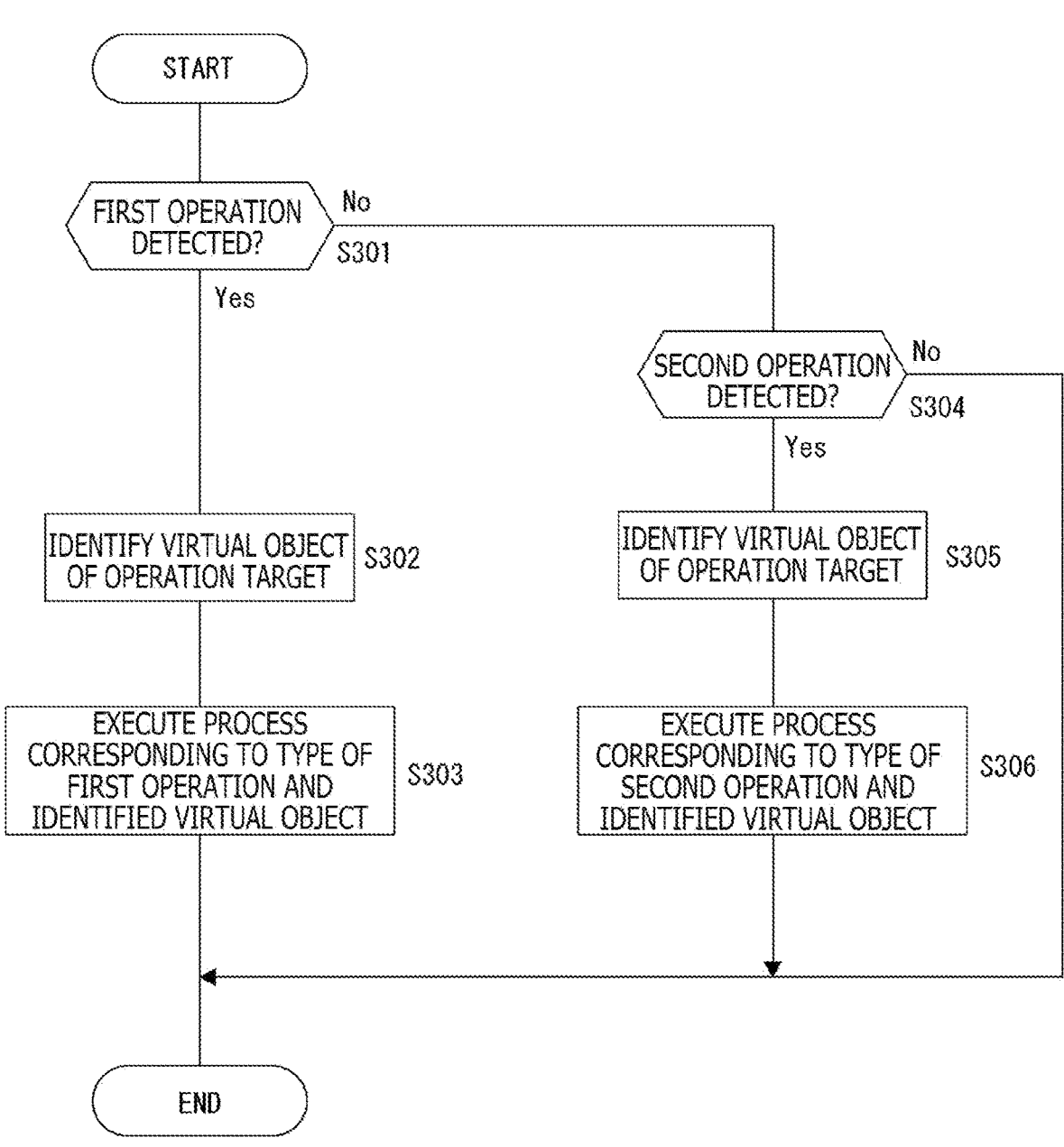
FIG. 22 is a flowchart for explaining a processing example executed by the processing unit in a sixth case.

FIG. 22 depicts an example of processes executed by the smartphone 1. Note that the image processing unit 4B and the control unit 9 herein will collectively and simply be referred to as the "processing unit" as in the other cases described above.

In Step S301, the processing unit determines whether or not the first operation has been detected. In a case of determining in Step S302 that the first operation has been detected, the processing unit performs a process for identifying the virtual object VOB designated as a target of the first operation. For example, the virtual object VOB at which the index finger IF of the user is pointing is identified on the basis of captured image data as the first sensing data, i.e., image data displayed on the display unit 10. In the case of the example depicted in FIG. 19, the virtual object VOB6 is identified as the virtual object VOB corresponding to a selection target.

In Step S303, the processing unit executes a process corresponding to operation contents of the first operation and the identified virtual object VOB.

The operation contents of the first operation will be touched upon herein. The user is allowed to conduct multiple gesture operations as the first operation in an augmented reality space presented by the smartphone 1.

For example, various types of actions are adoptable, such as actions of grasping, pinching, hitting, placing on the palm, flicking, stroking, and turning over the virtual object VOB corresponding to the operation target.

For example, adoptable corresponding processes are a process for causing the display unit 10 to display a web page associated with the real object ROB on which the virtual object VOB is superimposed (hereinafter referred to as a "target real object ROB"), a process for causing the display unit 10 to display simplified information associated with the target real object ROB in such a form as a balloon, a process for changing display of the virtual object VOB to hidden display, a process for changing a display color, a shape, a size, or the like of the virtual object VOB, a process for obtaining a coupon of a store associated with the target real object ROB, a process for registering a position of a store as the target real object ROB, and a process for starting an application (e.g., camera application) different from an application for displaying the augmented reality space. Moreover, for example, the adoptable corresponding process is a process for changing light emission intensity of the light emitting unit 7 included in the second sensing unit 3, to measure a distance to the target real object ROB.

The following situation is considered as an example of a light emission intensity change of the light emitting unit 7. In a case where the real object ROB on which the virtual object VOB designated as an operation target is superimposed is located at a distance longer than a predetermined distance, light emission intensity is increased to measure the distance to this real object ROB.

The various corresponding processes described above may be executed in association with types of gesture operations as the first operation. In other words, processes to be executed may be configured to change according to a change of gesture operations.

Moreover, various types of the virtual objects VOB are adoptable. The operable types of the first operations and the corresponding processes may be determined according to the types of the virtual objects VOB.

For example, if the virtual object VOB is an object associated with an advertisement, a process for displaying a web page presenting details of the advertisement or a web page where an advertised product is purchasable is allowed to be executed as the corresponding process. In addition, only the first operation for executing such a corresponding process may be made acceptable.

Further, the gestures and the corresponding processes allowed to be executed may vary according to not the types of the virtual objects VOB, but the stores as the real objects ROB on which the virtual objects VOB are superimposed. For example, the processing unit may be configured to accept a gesture operation for moving a finger in a manner following an external shape of a logo or a character of the store as the real object ROB or a gesture operation for changing a shape of a hand in a manner imitating the shape of the logo or the character. In addition, the processing unit may be configured to execute a process for acquiring a coupon associated with this store to perform the corresponding process. In other words, even if the virtual object VOB is of a similar type indicating a signboard of a store, the gesture operation allowed to be executed may be varied according to the type of the store.

Note that multiple processes may be executed as the corresponding processes. For example, a process for acquiring position information associated with the virtual object VOB, in response to a specific gesture operation conducted for the virtual object VOB, a process for starting an application as SNS (Social Networking Service), and a process for inputting, to a posted message column of this application, information for identifying the position of the virtual object VOB or information associated with a store name or the like may be executed as the corresponding processes.

After completion of the process in Step S303, the processing unit ends the series of processes illustrated in FIG. 22.

In a case of determining in Step S301 that the first operation has not been detected, the processing unit determines in Step S304 whether or not the second operation has been detected.

In a case of determining that the second operation has been detected, the processing unit performs, in Step S305, a process for identifying the virtual object VOB designated as an operation target. This process is a process for identifying the virtual object VOB displayed at a position corresponding to a touch operation performed by the user on the display unit 10.

After the virtual object VOB as the operation target is identified, the processing unit executes a process corresponding to operation contents of the second operation and the identified virtual object VOB in Step S306.

As described above, various types of the touch operations as the second operation are adoptable, such as a single tap operation and a double tap operation. Moreover, various types of the corresponding processes are adoptable as in the first operation. In addition, the acceptable second operation and the corresponding process may be determined according to the type of the virtual object VOB.

Note that the corresponding process allowed to be executed may be a process different between the first operation and the second operation. As an example, the processing unit may be configured to accept an operation for moving the virtual object VOB as the first operation, and prohibit acceptance of this operation as the second operation. Further, on the contrary, the processing unit may be configured to accept an operation for displaying a web page associated with the virtual object VOB as the second operation, and prohibit acceptance of this operation as the first operation.

As described above, the acceptable operation is varied for the first operation and the second operation. Accordingly, only an operation likely to be performed by a human directly touching the virtual object VOB is made acceptable as the first operation, and only an operation likely to be performed by a human touching the virtual object VOB displayed on the display unit 10 is made acceptable as the second operation. In this manner, the user is allowed to perform intuitive operations, and therefore easily achieve separate use of the first operation and the second operation without consciousness.

8. Fourth Embodiment

A fourth embodiment is an example of a smartphone 1C which includes two image sensors.

Figure 23:
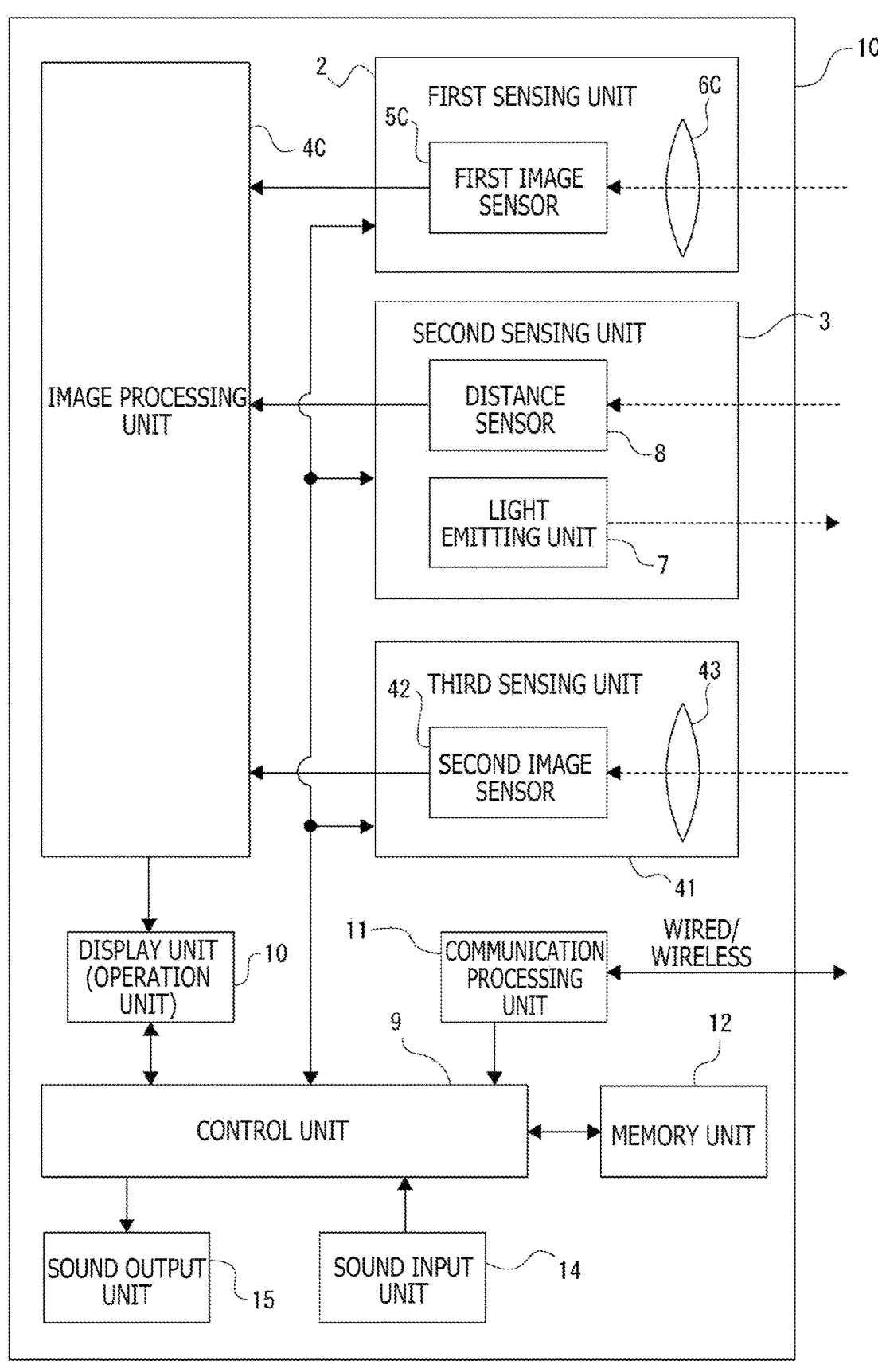
FIG. 23 is a block diagram depicting a configuration example of an image processing apparatus according to a fourth embodiment.

FIG. 23 depicts a configuration example of the smartphone 1C.

Note that configurations similar to the corresponding configurations of the smartphone 1 in the first embodiment depicted in FIG. 2 are given identical reference signs, and will not be repeatedly described where appropriate.

The smartphone 1C includes the first sensing unit 2, the second sensing unit 2, and a third sensing unit 41 as three sensing units.

The first sensing unit 2 includes a first image sensor 5C and a first imaging optical system 6C. The first image sensor 5C and the first imaging optical system 6C are configured similarly to the image sensor 5 and the imaging optical system 6 in the first embodiment.

The second sensing unit 3 includes the light emitting unit 7 and the distance sensor 8, and is configured similarly to the second sensing unit 3 in the first embodiment.

The third sensing unit 41 includes a second image sensor 42 and a second imaging optical system 43. Accordingly, the first sensing unit 2 and the third sensing unit 41 constitute two image sensors included in the smartphone 1C.

The second image sensor 42 includes multiple pixels similarly to the first image sensor 5C. Moreover, the second imaging optical system 43 is configured similarly to the first imaging optical system 6C, and includes multiple types of lenses and the like.

The first image sensor 5C of the first sensing unit 2 captures an image in a facing direction of the surface of the smartphone 1C on the side opposite to the side where the display unit 10 is provided, i.e., the back side of the display unit 10 as viewed from the user visually recognizing the display unit 10, to thereby output captured image data as the first sensing data. The sensing data output from the first image sensor 5C herein is data obtained by imaging the rear side of the smartphone 1C, and therefore will be referred to as rear captured image data.

The second image sensor 42 of the third sensing unit 41 captures an image in a facing direction of the display surface of the display unit 10 of the smartphone 1C, i.e., the front side as viewed from the user visually recognizing the display unit 10, to thereby output captured image data as third sensing data. The sensing data output from the second image sensor 42 herein is data obtained by imaging the front side of the smartphone 1C, and therefore will be referred to as front captured image data.

Other parts of the smartphone 1C are configured similarly to the corresponding parts in the first embodiment, and therefore will not be repeatedly described in detail. Note that the smartphone 1C has the image processing unit 4B having each of the functions depicted in FIG. 16.

As depicted in FIG. 16, the image processing unit 4B includes the data acquisition unit 21, the recognition processing unit 22, the display processing unit 23, the switching processing unit 26, and the operation target identification unit 27.

The recognition processing unit 22 performs a process for recognizing the index finger IF of the user. Either the captured image data or the distance data is available for performing the process for recognizing the index finger IF of the user. Note that the recognition processing unit 22 detects the index finger IF of the user by using both the rear captured image data and the front captured image data.

The switching processing unit 26 performs a process for switching to the first mode in a case of detection of the index finger IF on the basis of the rear captured image data. On the other hand, the switching processing unit 26 performs a process for switching to the second mode in a case of detection of the index finger IF on the basis of the front captured image data.

The data acquisition unit 21, the display processing unit 23, and the operation target identification unit 27 have configurations similar to the corresponding configurations described in the above example, and therefore will not be repeatedly described.

An example of processes executed by the image processing unit 4B and the control unit 9 of the smartphone 1 according to the fourth embodiment will be described with reference to FIG. 24. Note that the image processing unit 4B and the control unit 9 herein will collectively and simply be referred to as a "processing unit" as in the other examples described above. In addition, processes similar to the processes in FIG. 17 are given identical reference signs, and will not be repeatedly described.

In Step S211, the processing unit determines whether or not the index finger IF of the user has been detected. In a case where the index finger IF of the user has been detected on the basis of the rear captured image data or the front captured image data, the process proceeds to Step S212. Note that the index finger IF detected herein may be any of the registered index fingers IF as own fingers of the user.

In a case of determining that the index finger IF of the user has been detected, the processing unit determines in Step S212 whether or not this detection has been made on the basis of the rear captured image data. In a case where the index finger IF of the user has been detected on the basis of the rear captured image data, the processing unit advances the process to Step S213 to determine whether or not the current mode is the first mode.

In a case where the current mode is not the first mode, i.e., in a case where the current mode is the second mode or where no mode is set, the processing unit performs a process for transitioning to the first mode in Step S203, a process for disabling the second operation in Step S204, and a process for changing a display mode in Step S205. As described in the third embodiment, one or some of the processes in Step S203, Step S204, and Step S205 may be executed.

In a case where the index finger IF of the user has been detected but not on the basis of the rear captured image data, i.e., in a case of determination "No" in Step S212, it is considered that this detection has been made on the basis of the front captured image data. In this case, the processing unit performs a process for determining in Step S214 whether or not the current mode is the second mode.

In a case where the current mode is not the second mode, the processing unit performs a process for transitioning to the second mode in Step S207, a process for enabling the second operation in Step S208, and a process for changing the display mode in Step S209. As described in the third embodiment, one or some of the processes in Step S207, Step S208, and Step S209 may be executed.

Figure 24:
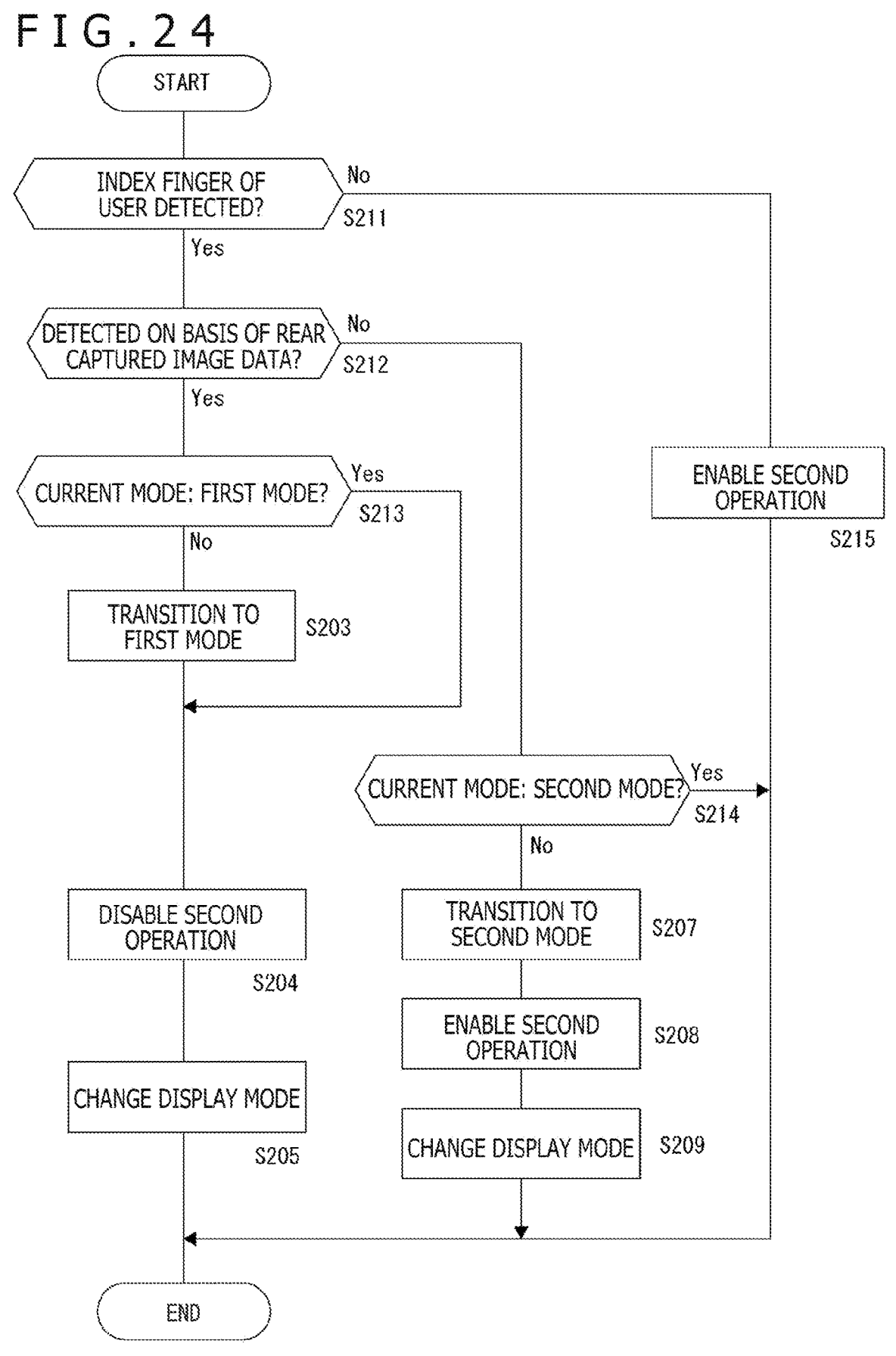

On the other hand, in the case where the current mode is the second mode, i.e., in a case of determination "Yes" in Step S214, the processing unit ends a series of processes illustrated in FIG. 24.

In a case where it is determined in Step S211 that the index finger IF of the user has not been detected, there is a possibility that the user conducts the second operation. Accordingly, the processing unit performs a process for enabling the second operation in Step S215. However, the process in Step S215 may be skipped in a case where the second operation has already been enabled. Meanwhile, if the process for disabling the second operation is not executed at the time of transition to the first mode, the process in Step S215 itself is unnecessary.

9. Summary

As described in the foregoing various examples, the smartphone 1 (1A, 1C) as an image processing apparatus includes the data acquisition unit 21 that acquires first sensing data that is image sensing data and second sensing data that is sensing data of a type different from the first sensing data, and the display processing unit 23 that performs a display process for displaying an augmented reality space formed by augmenting a real space with use of the first sensing data and the second sensing data.

According to this configuration, the augmented reality space can be displayed on the basis of information not acquirable from the image sensing data.

For example, information associated with a step or the like difficult to recognize from image data can be extracted from the second sensing data, and displayed on the real space.

As described with reference to FIG. 3, FIGS. 4 to 8, and other figures, the display processing unit 23 of the smartphone 1 (1A, 1C) may perform, by using the second sensing data, a display process for superimposing the virtual object VOB on the real object ROB recognized as an object present in the real space.

The superimposed display of the virtual object VOB on the real object ROB achieves display of an augmented reality space where the virtual object VOB is arranged without giving a sense of strangeness.

Moreover, by displaying superimposed information associated with the real object ROB as the virtual object VOB, information necessary for the user can be provided without giving a sense of strangeness.

As described with reference to FIG. 2 and other figures, the second sensing data of the smartphone 1 (1A, 1C) may be sensing data from which distance information (distance data) associated with the real object ROB is extractable.

According to this configuration, the display mode of the virtual object VOB can be varied according to the distance information.

For example, the size of the virtual object VOB to be superimposed can be varied according to the distance of the real object ROB, or display of the virtual object VOB to be superimposed can be made more conspicuous as the real object ROB is located closer.

As described in the first case with reference to FIG. 4 and other figures, the display processing unit 23 of the smartphone 1 (1A, 1C) may perform a display process for issuing an alert regarding a step detected with use of the distance information (distance data).

According to this configuration, a notification of information associated with a step or the like not recognized by the user can be issued as the virtual object VOB.

For example, in a case where the image processing apparatus having this configuration is a portable terminal device such as the smartphone 1 (1A, 1C) including the image processing unit 4 (4A, 4B), this configuration contributes to improvement of safety for the user walking while operating the portable terminal device.

As described in the third case with reference to FIG. 6 and other figures, the display processing unit 23 of the smartphone 1 (1A, 1C) may determine the size of the virtual object VOB superimposed on the real object ROB, according to the distance of the real object ROB.

According to this configuration, the size of the virtual object VOB is determined according to the distance from the user.

Accordingly, this configuration achieves superimposed display of the virtual objects VOB without giving a sense of strangeness.

As described in the second embodiment with reference to FIG. 10, the second sensing data of the smartphone 1 (1A, 1C) may be sensing data on the basis of which the material of the real object ROB is identifiable. The display processing unit 23 may perform a display process for superimposing the virtual object VOB on the real object ROB whose material is identified.

For example, the sensor for outputting the second sensing data is the polarization sensor 31, a multispectral sensor, or the like.

With use of the second sensing data on the basis of which the material is identifiable, a display mode of the virtual object VOB is adoptable according to the material. Specifically, by adopting such an expression suited for the material of the real object ROB to improve reality of the virtual object VOB, a sense of immersion of the user into the augmented reality space can be enhanced.

Figure 12:
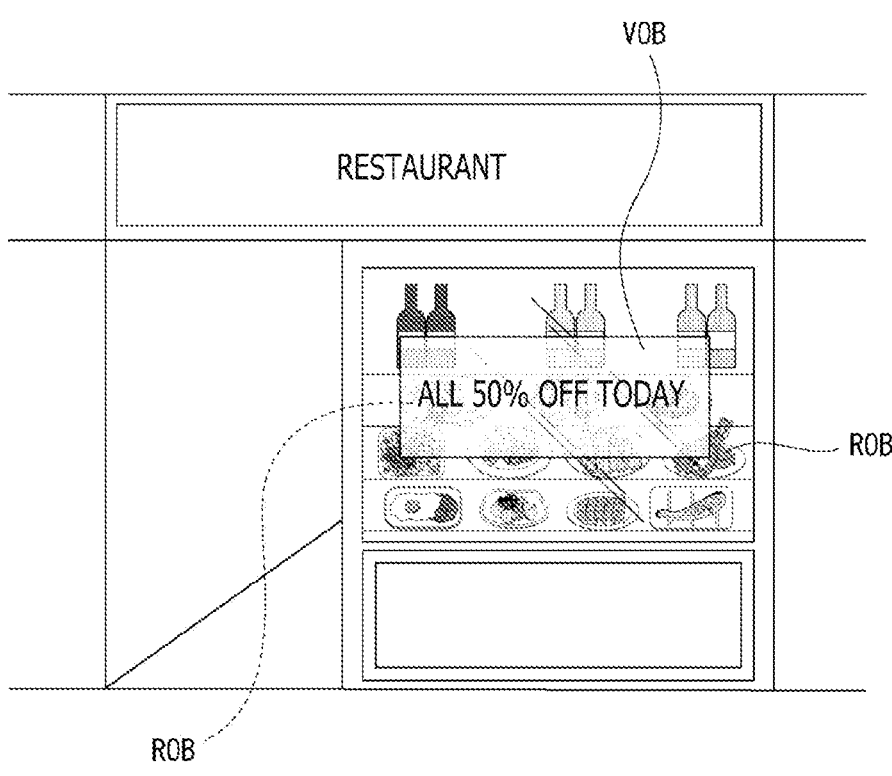
FIG. 12 is a diagram depicting a display example of a virtual object according to the second embodiment.

As described in the second embodiment with reference to FIG. 12 and other figures, the smartphone 1 (1A, 1C) may include the self-position estimation unit 25 that estimates a self-position. The self-position estimation unit 25 may correct the self-position on the basis of material information associated with the real object ROB.

According to this configuration, highly accurate self-position information can be obtained.

Accordingly, optimum information can be superimposed and displayed as the virtual object VOB on the basis of highly accurate self-position information. For example, by estimating floor information or the like, which is difficult to identify on the basis of GNSS information or the like, from the second sensing data, the virtual object VOB containing appropriate information corresponding to a floor can be superimposed and displayed.

As described in the second embodiment with reference to FIG. 12 and other figures, the display processing unit 23 of the smartphone 1 (1A, 1C) may perform a display process for displaying the virtual object VOB to be superimposed, in a mode different between the real object ROB whose material identified with use of the second sensing data is a transparent material and the real object ROB whose material identified with use of the second sensing data is not a transparent material.

For example, in a case where the first sensing data that is the image sensing data is used, there is a possibility that the real object ROB such as a door including glass and a window is difficult for the user to recognize. In such a case, the real object ROB which is a glass member can be recognized with use of the polarization sensor 31, a multispectral sensor, or the like, thereby allowing the virtual object VOB to be superimposed and displayed on the glass member.

The superimposed display of the virtual object VOB on the glass member allows the user to recognize the presence of the glass member, and therefore contributes to improvement of safety. Moreover, for example, semitransparent display of the virtual object VOB superimposed and displayed on the glass member produces a state allowing recognition of the presence of another real object ROB located on the back side of the glass member as well. In other words, this configuration can create such a state allowing visual recognition of a target object by both a user desiring to visually recognize the virtual object VOB superimposed and displayed on the glass member and a user desiring to visually recognize the real object ROB located on the back side of the glass member. Accordingly, userfriendliness improves.

As described in the second embodiment with reference to FIG. 10 and other figures, the second sensing data of the smartphone 1 (1A, 1C) may be sensing data on the basis of which a polarized state of light reflected from the real object ROB is identifiable.

Specifically, the second sensing data is sensing data output from the polarization sensor 31.

In this manner, the advantageous effects described above can be obtained with use of the polarization sensor 31.

As described in the fourth case with reference to FIG. 7, FIG. 8, and other figures, the display processing unit 23 of the smartphone 1 (1A, 1C) may perform a display process for superimposing the virtual object VOB on the real object ROB identified as a part of a human body on the basis of the second sensing data.

For example, some persons do not desire to appear in an image or a video. Particularly, considering issues of privacy, it is not preferable to store or stream an image captured in a state where persons are identifiable. According to this configuration, a part of a human body, such as a face, is identified, and the virtual object VOB can be superimposed and displayed on the identified part of the human body.

In this manner, identification of a person within a captured image can be prohibited, and therefore, privacy protection of a third party can be guaranteed.

As described in the second embodiment, the first sensing data and the second sensing data of the smartphone 1 (1A, 1C) may be generated on the basis of signals output from an identical sensor.

For example, not only image sensing data but also distance data can be acquired from data output from a CMOS sensor, in some cases. Moreover, image sensing data and distance data can be acquired in a case of use of an image sensor carrying a mixture of image plane phase-difference pixels and color pixels in red, blue, and green.

By extracting the first sensing data and the second sensing data from the one sensor as described above, cost reduction and size reduction of the smartphone 1 (1A, 1C) as the image processing apparatus are both achievable.

As described in the second embodiment with reference to FIG. 14 and other figures, the smartphone 1 (1A, 1C) may include the switching processing unit 26 that switches between the first mode for accepting the first operation for the virtual object VOB and the second mode for accepting the second operation for the virtual object VOB. The switching processing unit 26 may switch to the first mode in a case where a predetermined portion of a user (e.g., the index finger IF) is recognized within the augmented reality space with use of the first sensing data or the second sensing data.

For example, the first process is executed in a case where a finger of the user (e.g., index finger IF) is recognized on the basis of the second sensing data from which distance information is extractable.

In this manner, the first process can be executed with use of the distance information associated with the finger of the user.

As described in the third embodiment with reference to FIG. 14, FIG. 15, and other figures, in the smartphone 1 (1A, 1C), the first mode may be a mode for accepting an operation achieved for the virtual object VOB according to movement of the predetermined portion (e.g., index finger IF) in the augmented reality space, and the second mode may be a mode for accepting a touch operation performed by the user for a display region of the virtual object VOB on the display unit 10.

For example, in a case where a virtual touch operation performed by a finger of the user (e.g., index finger IF) for the virtual object VOB in the augmented reality space is detected by a ranging sensor or the like, transition to the first mode is achieved. In a case where a touch operation for the image region of the virtual object VOB displayed on the display unit is detected, transition to the second mode is achieved.

In this manner, the user is allowed to switch the operation mode in consideration of ease of operation or the like. In other words, operability improves.

As described in the fifth case with reference to FIGS. 18 to 21 and other figures, the display processing unit 23 of the smartphone 1 (1A, 1C) may designate a different display mode of the display object (virtual object VOB, icon image Pi) between the first mode and the second mode.

The display object is an object displayed on the display unit. For example, the display object includes not only the virtual object VOB arranged in the augmented reality space, but also the icon image Pi and the like not arranged in the augmented reality space. The example which varies the display mode of the display object includes an example which changes a display size, an example which switches between display and non-display for each display object, and other examples.

For example, in a case of execution of an operation for directly touching the virtual object VOB arranged in the augmented reality space, visibility of the virtual object VOB may be lowered by an operation icon displayed on the display unit 10. Accordingly, operability can be raised by performing a display process for hiding display of the operation icon in the first mode.

Specifically, an optimum UI (User Interface) for the first mode may be different from an optimum UI for the second mode. In this case, operability can be raised by designating the different display mode of the display object between the first mode and the second mode.

As described in the fifth case with reference to FIGS. 18 to 21 and other figures, the display processing unit 23 of the smartphone 1 (1A, 1C) may perform a display process for designating a different size of the virtual object VOB between the first mode and the second mode.

For example, an optimum UI for the first mode may be different from an optimum UI for the second mode. In this case, a different size of the virtual object VOB is designated for the first mode and the second mode. Specifically, in a case where an operation for the virtual object VOB is detected in the augmented reality space, the virtual object VOB is displayed in a large size to improve visibility, for the user, of letter information or the like displayed as the virtual object VOB. Meanwhile, in a case where a touch operation or the like for the display unit 10 is detected, this operation is recognized as a selection operation for selecting the virtual object VOB, and a process for displaying a web page associated with the virtual object VOB provided as an advertisement object or the like is executed, for example.

In the manner described above, the size of the virtual object VOB is varied according to the operation mode to improve operability for the user.

As described in the fifth case with reference to FIG. 18, FIG. 19, and other figures, the display processing unit 23 of the smartphone 1 (1A, 1C) may perform an occlusion process for the virtual object VOB on the basis of distance information (distance data) associated with the predetermined portion (e.g., index finger IF).

For example, in a case where the predetermined portion is a finger of the user and is located at a short distance, an occlusion process is performed to hide the virtual object VOB behind the finger of the user.

In this manner, the user is allowed to visually recognize the augmented reality space without feeling a sense of strangeness.

As described in the second embodiment with reference to FIG. 16 and other figures, the smartphone 1 (1A, 1C) may include the operation target identification unit 27 that identifies the virtual object VOB designated as a target of an operation performed by the predetermined portion (e.g., index finger IF), with use of the first sensing data in a case where the predetermined portion is recognized.

It is possible that the user operates the virtual object VOB while viewing the virtual object VOB and an image of his or her finger which are displayed on the display unit 10. In such a case, the virtual object VOB corresponding to the operation target is identified according to a positional relation between the image of the finger and the virtual object VOB on the display unit 10.

In this manner, the user is allowed to select the virtual object VOB corresponding to the operation target by an intuitive operation. Accordingly, operability improves.

As described in the fourth embodiment with reference to FIG. 23 and FIG. 24, the switching processing unit 26 of the smartphone 1 (1A, 1C) may switch to the second mode in a case where the predetermined portion (e.g., index finger IF) is detected on the basis of sensing data (front captured image data) obtained by imaging in a direction opposite to an imaging direction of an imaging unit (first sensing unit 2) that obtains the first sensing data (rear captured image data).

In such a case, it is estimated that the predetermined portion of the user is located before the display unit 10, and it is therefore assumed that the first operation is not likely to be conducted. Accordingly, it is considered that switching to the second mode for accepting the second operation is most appropriate. After switching to the second mode, such processes as the process for detecting the predetermined portion of the user on the basis of the second sensing data are suspended.

In this manner, the necessity of performing various processes assumed to be executed by the smartphone 1 in the first mode is eliminated. Accordingly, reduction of a processing load on the smartphone 1 is achievable.

Note that the fourth embodiment described above has been the example where the smartphone 1C performs the process for detecting the index finger IF as the predetermined portion of the user with use of the captured image data output from the first sensing unit 2 and the distance data output from the second sensing unit 3 and the display process corresponding to the detected index finger IF. In other words, the example where the smartphone 1C has the three sensing units has been described.

The smartphone 1C in a different mode may include a sensing unit which outputs two types of captured image data, and omit a sensing unit which outputs distance data.

In other words, the image processing apparatus may be configured to execute image processing for an augmented reality space by acquiring one type of sensing data (captured image data) from two camera units, instead of executing image processing for an augmented reality space on the basis of two types of sensing data (e.g., captured image data and distance data).

The image processing apparatus described above can have the following configuration.

An image processing apparatus including:

a data acquisition unit that acquires first captured image data output from a first imaging unit for imaging in a first direction and second captured image data output from a second imaging unit for imaging in a direction opposite to the first direction; and a display processing unit that performs a display process for displaying an augmented reality space formed by augmenting a real space with use of the first captured image data and the second captured image data.

The display processing unit executes a first display process as the display process in a case where a predetermined portion of a user is detected on the basis of the first captured image data.

The display processing unit executes a second display process as the display process in a case where the predetermined portion is detected on the basis of the second captured image data.

The first imaging unit herein refers to the first sensing unit 2, such as a rear camera, included in the smartphone 1C, while the second imaging unit refers to the third sensing unit 41, such as a front camera, included in the smartphone 1C. Moreover, the first direction refers to a facing direction of the surface of the smartphone 1C on the side opposite to the side where the display unit 10 is provided, while the second direction is a facing direction of the display unit 10.

Further, for example, the first process refers to a process for transitioning to the first mode, a process for disabling the second operation, or a process for changing the display mode such as the process in Step S205.

In addition, for example, the second process refers to a process for transitioning to the second mode, a process for enabling the second operation, or a process for changing the display mode such as the process in Step S209.

As obvious from above, the advantageous effects described above can be obtained without using distance data.

Note that advantageous effects to be offered are not limited to those described in the present description by way of example. Other advantageous effects may further be produced.

In addition, the examples described above may be combined in any manners. The various operational advantages described above can similarly be obtained even from various combinations of the above examples.

10. Present Technology

The present technology can also adopt the following configurations.

(1)

An image processing apparatus including:

a data acquisition unit that acquires first sensing data that is image sensing data and second sensing data that is sensing data of a type different from the first sensing data; and a display processing unit that performs a display process for displaying an augmented reality space formed by augmenting a real space with use of the first sensing data and the second sensing data, in which the display processing unit performs, by using the second sensing data, a display process for super-imposing a virtual object on a real object recognized as an object present in the real space.

(2)

The image processing apparatus according to (1) above, in which the second sensing data is sensing data from which distance information associated with the real object is extractable.

(3)

The image processing apparatus according to (2) above, including:

a switching processing unit that switches between a first mode for accepting a first operation for the virtual object and a second mode for accepting a second operation for the virtual object, in which the switching processing unit switches to the first mode in a case where a predetermined portion of a user is recognized within the augmented reality space by using the first sensing data or the second sensing data.

(4)

The image processing apparatus according to (3) above, in which the first mode is a mode for accepting an operation performed for the virtual object according to movement of the predetermined portion in the aug-mented reality space, and the second mode is a mode for accepting a touch operation performed by the user for a display region of the virtual object on a display unit.

(5)

The image processing apparatus according to (4) above, in which the display processing unit designates a different display mode of a display object between the first mode and the second mode.

(6)

The image processing apparatus according to (5) above, in which the display processing unit performs a display process for designating a different size of the virtual object between the first mode and the second mode.

(7)

The image processing apparatus according to any one of (3) to (6) above, in which the display processing unit performs an occlusion process for the virtual object on the basis of distance information associated with the predeter-mined portion.

(8)

The image processing apparatus according to any one of (3) to (7) above, including:

an operation target identification unit that identifies the virtual object designated as a target of an operation performed by the predetermined portion, with use of the first sensing data in a case where the predetermined portion is recognized.

(9)

The image processing apparatus according to any one of (3) to (8) above, in which the switching processing unit switches to the second mode in a case where the predeter-mined portion is detected on the basis of sensing data obtained by imaging in a direction opposite to an imaging direction of an imaging unit that obtains the first sensing data.

(10)

The image processing apparatus according to any one of (2) to (9) above, in which the display processing unit performs a display process for issuing an alert regarding a step detected with use of the distance information.

(11)

The image processing apparatus according to any one of (2) to (10) above, in which the display processing unit determines a size of the virtual object to be superimposed on the real object, according to a distance of the real object.

(12)

The image processing apparatus according to any one of (1) to (11) above, in which the second sensing data is sensing data on the basis of which a material of the real object is identifi-able, and the display processing unit performs a display process for superimposing the virtual object on the real object whose material is identified.

(13)

The image processing apparatus according to (12) above, including:

a self-position estimation unit that estimates a self-posi-tion, in which the self-position estimation unit corrects the self-position on the basis of material information asso-ciated with the real object.

(14)

The image processing apparatus according to any one of (12) to (13) above, in which the display processing unit performs a display process for displaying the virtual object to be superimposed, in a mode different between the real object whose material identified with use of the second sensing data is a transparent material and the real object whose material identified with use of the second sensing data is not a transparent material.

(15)

The image processing apparatus according to any one of (12) to (14) above, in which the second sensing data is sensing data on the basis of which a polarized state of light reflected from the real object is identifiable.

(16)

The image processing apparatus according to any one of (12) to (15) above, in which the display processing unit performs a display process for superimposing the virtual object on the real object identified as a part of a human body with use of the second sensing data.

(17)

The image processing apparatus according to any one of (2) to (11) above, in which the first sensing data and the second sensing data are generated on the basis of signals output from an identical sensor.

(18)

An image processing method causing a computer device to execute:

a process that acquires first sensing data that is image sensing data and second sensing data that is sensing data of a type different from the first sensing data; and a display process for displaying an augmented reality space formed by augmenting a real space with use of the first sensing data and the second sensing data.

(19)

An image processing system including:

a display unit that is capable of displaying an image;

a first sensing unit that acquires first sensing data that is image sensing data;

a second sensing unit that acquires second sensing data that is sensing data of a type different from the first sensing data; and a display processing unit that performs a display process for causing the display unit to display an augmented reality space formed by augmenting a real space with use of the first sensing data and the second sensing data.

REFERENCE SIGNS LIST

1, 1A, 1C: Smartphone
2: First sensing unit (first imaging unit)
10: Display unit
21: Data acquisition unit
23: Display processing unit
25: Self-position estimation unit
26: Switching processing unit
27: Operation target identification unit
41: Third sensing unit (second imaging unit)
ROB: Real object
VOB, VOB1, VOB2, VOB3, VOB4, VOB5, VOB6, VOB7, VOB8: Virtual object (display object)
Pi: Icon image (display object)
IF: Index finger (predetermined portion)

The invention claimed is:

1. An image processing apparatus, comprising:
a central processing unit (CPU) configured to:
    acquire first sensing data that corresponds to first image sensing data;
    acquire second sensing data different from the first sensing data;
    extract, from the second sensing data, first distance information associated with a real object;
    augment a reality space based on each of the first sensing data and the second sensing data, wherein the reality space includes the real object;
    superimpose a virtual object on the real object based on each of the second sensing data and the extracted first distance information;
    control a display process to display the augmented reality space, wherein the displayed augmented reality space includes the superimposed virtual object on the real object;
    determine, based on at least one of the first sensing data or the second sensing data, a specific portion of a user in the displayed augmented reality space;
    switch, based on the determination of the specific portion of the user in the displayed augmented reality space, between a first mode and a second mode;
    accept one of a first operation or a second operation based on the switch between the first mode and the second mode, wherein
        the first mode is associated with
            the accepted first operation for the virtual object, and
            the determination of the specific portion of the user in the displayed augmented reality space, and
        the second mode is associated with the accepted second operation for the virtual object; and
    perform an occlusion process associated with the virtual object, wherein the occlusion process is based on
        the accepted first operation for the virtual object, and
        second distance information associated with the determined specific portion.
2. The image processing apparatus according to claim 1, wherein
the first operation is based on movement of the determined specific portion in the augmented reality space, the second operation corresponds to a touch operation on a display region of the virtual object,
the touch operation is based on a user input, and
the display region is on a display screen.
3. The image processing apparatus according to claim 2, wherein the CPU is further configured to:
    designate, in the first mode, a first display mode of a display object; and
    designate, in the second mode, a second display mode of the display object,
    wherein the first display mode of the display object is different from the second display mode of the display object.
4. The image processing apparatus according to claim 3, wherein the CPU is further configured to control the display process to
    designate a first size of the virtual object in the first mode; and
    designate a second size of the virtual object in the second mode, wherein the first size of the virtual object is different from the second size of the virtual object.
5. The image processing apparatus according to claim 1, wherein
    the CPU is further configured to determine the virtual object based on the first sensing data and the determined specific portion of the user,
    the virtual object corresponds to a target of a specific operation, and
    the specific operation is associated with the determined specific portion.
6. The image processing apparatus according to claim 1, wherein the CPU is further configured to:
    acquire, from a first sensor, second image sensing data, wherein
        the first sensor captures the second image sensing data from a first direction,
        a second sensor captures the first image sensing data from a second direction, and
        the first direction is opposite to the second direction;
    determine, based on the second image sensing data, the specific portion in the augmented reality space; and
    switch to the second mode based on the determination of the specific portion in the augmented reality space.
7. The image processing apparatus according to claim 1, wherein the CPU is further configured to:
    determine, based on the extracted first distance information, a specific step associated with the real object; and
    control the display process to issue an alert associated with the determined specific step.
8. The image processing apparatus according to claim 1, wherein the CPU is further configured to determine a size of the virtual object based on the extracted first distance information.
9. The image processing apparatus according to claim 1, wherein the CPU is further configured to:
    determine, based on the second sensing data, a material of the real object; and
    control, after the determination of the material of the real object, the display process to superimpose the virtual object on the real object.
10. The image processing apparatus according to claim 9, wherein
    the CPU is further configured to:
        determine a self-position of the image processing apparatus; and correct, based on material information, the self-position of the image processing apparatus, and the material information is associated with the determined material of the real object.

11. The image processing apparatus according to claim 9, wherein the CPU is further configured to control the display process to display the virtual object in one of a third mode or a fourth mode different from the third mode, in the third mode, the determined material of the real object corresponds to a transparent material, and in the fourth mode, the determined material of the real object corresponds to a specific material different from the transparent material.

12. The image processing apparatus according to claim 9, wherein the CPU is further configured to determine, based on the second sensing data, a polarized state of light, and the light is reflected from the real object.

13. The image processing apparatus according to claim 9, wherein the CPU is further configured to:

determine the real object based on the second sensing data, wherein the real object corresponds to a part of a human body; and control, based on the determined real object, the display process to superimpose the virtual object on the real object.

14. The image processing apparatus according to claim 1, wherein the CPU is further configured to generate, based on signals generated from a sensor, the first sensing data and the second sensing data.

15. An image processing method, comprising:

in an image processing apparatus:

acquiring first sensing data that corresponds to image sensing data;

acquiring second sensing data different from the first sensing data;

extracting, from the second sensing data, first distance information associated with a real object;

augmenting a reality space based on each of the first sensing data and the second sensing data, wherein the reality space includes the real object;

superimposing a virtual object on the real object based on each of the second sensing data and the extracted first distance information;

controlling a display process for displaying the augmented reality space, wherein the displayed augmented reality space includes the superimposed virtual object on the real object;

determining, based on at least one of the first sensing data or the second sensing data, a specific portion of a user in the displayed augmented reality space;

switching, based on the determination of the specific portion of the user in the displayed augmented reality space, between a first mode and a second mode;

accepting one of a first operation or a second operation based on the switch between the first mode and the second mode, wherein the first mode is associated with the accepted first operation for the virtual object, and the determination of the specific portion of the user in the displayed augmented reality space, and the mode is associated with the accepted second operation for the virtual object; and performing an occlusion process associated with the virtual object, wherein the occlusion process is based on the accepted first operation for the virtual object, and second distance information associated with the determined specific portion.

16. An image processing system, comprising:

a first sensor configured to acquire first sensing data that corresponds to image sensing data;

a second sensor configured to acquire second sensing data different from the first sensing data; and a central processing unit (CPU) configured to:

extract, from the second sensing data, first distance information associated with a real object;

augment a reality space based on each of the first sensing data and the second sensing data, wherein the reality space includes the real object;

superimpose a virtual object on the real object based on each of the second sensing data and the extracted first distance information;

control a display process to display the augmented reality space, wherein the displayed augmented reality space includes the superimposed virtual object on the real object;

determine, based on at least one of the first sensing data or the second sensing data, a specific portion of a user in the displayed augmented reality space;

switch, based on the determination of the specific portion of the user in the displayed augmented reality space, between a first mode and a second mode;

accept one of a first operation or a second operation based on the switch between the first mode and the second mode, wherein the first mode is associated with the accepted first operation for the virtual object, and the determination of the specific portion of the user in the displayed augmented reality space, and the second mode is associated with the accepted second operation for the virtual object; and perform an occlusion process associated with the virtual object, wherein the occlusion process is based on the accepted first operation for the virtual object, and second distance information associated with the determined specific portion.

* * * * *